(12) United States Patent
Huck et al.

(10) Patent No.: US 7,516,179 B2
(45) Date of Patent: Apr. 7, 2009

(54) CONTROL UNIT OPERATIONS IN A REAL-TIME COLLABORATION SERVER

(75) Inventors: Paul Huck, Palo Alto, CA (US); Aleksey Skurikhin, Foster City, CA (US); Ilya Teplov, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 54 days.

(21) Appl. No.: 11/732,882

(22) Filed: Apr. 4, 2007

(65) Prior Publication Data
US 2007/0185958 A1      Aug. 9, 2007

Related U.S. Application Data

(62) Division of application No. 10/387,984, filed on Mar. 13, 2003, now Pat. No. 7,219,127.

(51) Int. Cl.
*G06F 15/16*    (2006.01)
*G06F 15/173*    (2006.01)

(52) U.S. Cl. .................. 709/204; 709/206; 709/223
(58) Field of Classification Search ................ 709/204, 709/206, 223
See application file for complete search history.

(56) References Cited

U.S. PATENT DOCUMENTS

| 5,729,687 | A | 3/1998 | Rothrock et al. |
| 6,151,621 | A | 11/2000 | Colyer et al. |
| 6,343,313 | B1 | 1/2002 | Salesky et al. |
| 7,024,451 | B2 | 4/2006 | Jorgenson |
| 7,043,529 | B1 | 5/2006 | Simonoff |
| 7,043,559 | B2 | 5/2006 | Boskovic et al. |

OTHER PUBLICATIONS

Roy, Anindo. Oracle iMeeting Implementation and Setup Guide, Release 11i (11.5.7.4), Part No. A97299-01, Apr. 2002. Pages i to Index-4. Copyright 2000, 2002, Oracle Corporation, Redwood City, CA, USA.
Oracle iMeeting Release Notes, Release 11i (11.5.7.4), Part No. A97324-01, Apr. 2002. Pages 1 to 8. Copyright 2002, Oracle Corporation, Redwood City, CA, USA.

*Primary Examiner*—Kevin Bates
(74) *Attorney, Agent, or Firm*—Park, Vaughan & Fleming LLP

(57) ABSTRACT

In a real-time collaboration server, a control unit manages a collaboration mode. The control unit operates a virtual client that maintains a virtual screen reflecting the status of the collaboration (e.g., the contents of a shared desktop or whiteboard). The virtual client renders collaboration data within the virtual screen. New clients are synchronized with an ongoing collaboration by packing and sending them a copy of the virtual screen. The control unit maintains a queue of collaboration data to be sent to participating clients. Each client may have a pointer identifying the queued data it is processing. The queue may be collapsed (e.g., when it reaches a maximum size) by sending a copy of the virtual screen to one or more clients that have not yet consumed old data in the queue; those clients are then updated to skip the queue entries embodied in the virtual screen.

18 Claims, 14 Drawing Sheets

CONTROL UNIT OPERATIONS IN A REAL-TIME COLLABORATION SERVER

This application is a divisional under 37 C.F.R §1.53(b) of and claims priority under 35 U.S.C. §121 to a non-provisional application by the same inventor as the instant application entitled, "CONTROL UNIT OPERATIONS IN A REAL-TIME COLLABORATION SERVER," having Ser. No. 10/387,984, and filing date 13 Mar. 2003 now U.S. Pat. No. 7,219,127.

BACKGROUND

This invention relates generally to the field of computer systems. More particularly, a system and method are provided for operating a control unit, in a real-time collaboration server, to share content from one collaboration client with other clients.

Real-time collaboration systems are useful for sharing information among multiple collaborators or participants, without requiring them to be physically colocated. However, existing systems have notable deficiencies. For example, existing systems cannot readily accommodate large numbers of users (e.g., hundreds, thousands) while providing acceptable performance. Instead, as more and more users join a collaboration system, the response time (or other measure of performance) degrades rapidly until the system becomes unusable or barely usable.

With some systems, the inclusion of just one slow user in a collaboration can bog down an entire system. This may be because the system enforces synchronous operations, in which each collaboration task must be completed before the next can be initiated. Or, a system may manage collaboration communications very poorly. For example, a system may be able to store only a limited amount of data to be disseminated to collaboration participants. When this maximum is reached, the system may be unable to accept and disseminate new data until the slow user finishes using the oldest data. Or, if the system can store an unlimited (or virtually unlimited) amount of data for dissemination, performance may suffer as the amount of data that are stored increases.

Other collaboration systems require the processes or logic modules that manage a collaboration to also handle communication with individual users. As the number of users grows, the burden of handling each user's communications as well as the collaboration logic becomes onerous.

Still other collaboration systems support only limited collaboration modes (e.g., application sharing, document sharing), and/or attempt to manage all modes with a single process. As a result, a mode that is not particularly busy may be detrimentally affected by the activity of another mode.

An application sharing mode of collaboration may entail the replication of content displayed on one user's computer upon other users' computers. One method of replicating content requires the interception of drawing and display commands executed on the first user's computer. Those commands are then replayed on the other users' computers. This method is generally limited to computer systems executing an operating system that supports such interception. In other environments, an intercepted command may not be supported or understood by the receiving user's computer.

Another method of replicating a computer screen involves capturing the first user's entire screen and sending it to the other users whenever it changes. For example, the values of every pixel in the screen may be transmitted. This method is often very slow, and may require a substantial amount of communication and processing for a small change (e.g., a cursor movement).

It may be difficult to add a new participant to an ongoing collaboration in an existing system. For example, the new participant may only be provided the collaboration data that are generated after he or she joins. This data may be meaningless without the context or status of the collaboration (e.g., the appearance of a shared document) at the time the new participant joined. Or, if the system attempts to copy the entire status of the collaboration every time a new participant joins, system performance may suffer.

Further, in existing collaboration systems a new participant's client often must be rebooted in order to configure it for a collaboration. This is typically due to the manner in which updates to the client video display are captured for use in the collaboration. Inefficient methods of enabling video updates to be captured may also be unstable, depending on how they perform the capture, or may be deactivated if a device driver is loaded or reloaded. Further, some methods only work for specific operating systems or specific versions of an operating system.

SUMMARY

In one embodiment of the invention, a control unit within a real-time collaboration server manages a collaboration mode. The control unit operates a virtual client that renders collaborative data within a virtual screen. The virtual screen thus reflects the status of the collaboration (e.g., the contents of a shared desktop or whiteboard). New clients are synchronized with an ongoing collaboration by packing and sending them a copy of the virtual screen. The virtual screen may be updated synchronously (i.e., before other clients) or asynchronously (i.e., at substantially the same time as other clients).

The control unit maintains a queue of data to be sent to clients in the collaboration. Each client may have an associated pointer or reference to identify, within the queue, the data that it is currently processing or will process next. The control unit adds to the queue data received from a collaboration presenter, and retires queued data that have been consumed by all clients.

In another embodiment of the invention, a control unit's queue may be collapsed when it reaches a maximum size. In this embodiment, the queue is collapsed by sending a copy of the current virtual screen to one or more clients that have not yet processed the oldest queued data. Those clients' pointers into the control unit queue are updated to skip the queue entries embodied in the virtual screen sent to the clients. Old queue entries that are no longer needed for any clients can then be discarded.

In one alternative embodiment, a control unit queue may be collapsed because of a slow client, even if the queue is not at its maximum size. Illustratively, a slow client is a client that is currently processing queued data that most, or all, of the other clients have already processed. In this embodiment, the control unit can, at any time, determine the amount of data or the number of queue entries that would have to be transmitted to a client to update it to the current status of the collaboration. The queue may be collapsed if it would be more efficient to send a client a virtual screen than to send the client all the queued data that are reflected in the virtual screen but have not yet been processed by the client. In this embodiment, the current virtual screen may be assembled and sent, or a copy of an older virtual screen may be sent.

DETAILED DESCRIPTION

Figure 1:
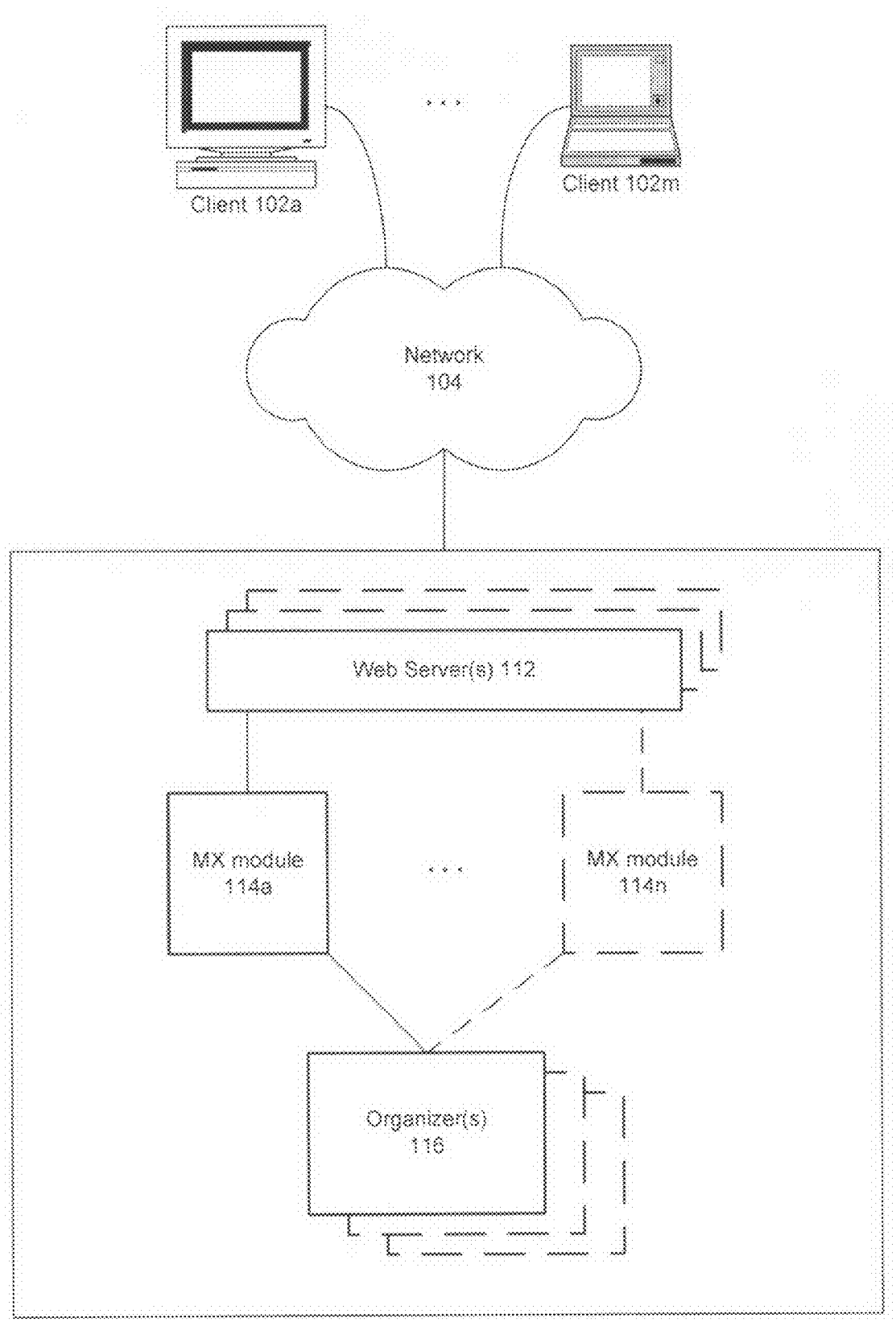
FIG. 1 depicts a collaboration server for managing collaborations, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

A system and method are provided for facilitating real-time collaboration. In one embodiment of the invention, a collaboration server is configured to serve large numbers of collaboration clients (e.g., thousands, tens of thousands), while supporting asynchronous operations for any number of collaboration modes. In this embodiment, each mode supports a different type of collaboration (e.g., chat, polling, voice, annotation, sharing web content, collaborative whiteboard, desktop sharing (i.e., sharing a client desktop)).

Control units control individual collaboration modes. For purposes of communicating with control units, clients are represented by client objects. For each collaboration mode a client belongs to, its client object may include a data provider and/or a data consumer.

A data provider object feeds data from a client (e.g., collaboration data to be distributed to other clients) to a control unit. Collaboration data are queued by a control unit and fed to clients through their corresponding data consumer objects. Separate communication modules ensure reliable delivery of the data to each client.

In another embodiment of the invention, a method is provided for sharing content displayed on one client's desktop. In this embodiment, different types of data (e.g., different graphical objects) or different types of updates to the desktop (e.g., different graphical operations) are compressed or collapsed. Changes to the desktop content may be sent as incremental updates, thereby limiting the amount of information that must be disseminated.

In another embodiment of the invention, a control unit configured to control a collaboration mode maintains a virtual screen tracking the status of the mode (e.g., the content within a shared desktop or whiteboard, chat content). The virtual screen may be maintained by a virtual client, and sent to new clients that join the mode while it is in progress. The control unit may maintain a queue of data to be disseminated to collaboration clients, and may collapse the queue when appropriate. By collapsing the queue, its size can be controlled. When the queue is collapsed, one or more relatively slow clients are sent a copy of the virtual screen and may thus avoid having to retrieve multiple sets of data from the queue.

In yet another embodiment of the invention, a real-time collaboration client is configured to enable desktop sharing and/or other modes of a real-time collaboration without having to reboot. Illustratively, the client is modified to intercept drawing commands and reduce changes to the client's display into primitives that can be disseminated to other collaboration clients.

A Real-Time Collaboration Server

FIG. 1 is a block diagram of a system for facilitating real-time collaboration, according to one embodiment of the invention. In this embodiment, collaboration attendees employ collaboration clients (e.g., clients 102a-102m) to access collaboration server 110 via network 104 or other direct or indirect communication links. A client may comprise a desktop computer, laptop computer, hand-held computer or other computing device. Network 104 may comprise the Internet.

Collaboration server 110 includes one or more web servers 112, any number of MX modules 114 (e.g., modules 114a-114n) and one or more organizers 116. Additional web servers, MX modules and/or organizers may be spawned or initiated by a collaboration monitor (not shown in FIG. 1) or other module.

Illustratively, web server 112 receives connections from clients, and redirects those connections to MX modules. A web server may also facilitate the distribution of web page content to collaboration clients.

MX modules 114 route communications between clients, organizers and/or other nodes of a collaboration system, while organizers manage and maintain collaboration sessions. The terms "collaboration" and "collaboration session" may be used interchangeably herein.

Each organizer 116 manages or controls one or more collaboration sessions hosted on collaboration server 110. Each collaboration may include any number of modes. Each mode may be considered a separate topic or support a separate purpose. Thus, a collaboration may include a desktop sharing mode (e.g., sharing one client's desktop with other attendees), a whiteboard mode (e.g., sharing a virtual or electronic whiteboard or drawing board), a chat mode, a music sharing mode, or other mode (e.g., polling, voice, annotation, web browsing).

Each MX module can handle connections from multiple clients on behalf of any number of organizers. Therefore, clients connected to a particular MX module may participate in the same or different collaborations or collaboration modes. An MX module maintains persistent connections with its connected clients, and may allocate one communication socket to each client and organizer that it supports.

In other embodiments of the invention, an MX module may serve as a connection point for other objects or entities (e.g., a collaboration monitor, a voice response unit, a collaboration recorder). The MX modules supporting an organizer need not be colocated with the organizer (i.e., they may not be in the same enclosure).

In the embodiment of FIG. 1, for each attendee or client connected to collaboration server 110, the MX module 114 handling the client's connection supports a virtual channel between the client and the organizer 116 that manages the client's collaboration. The MX module receives and forwards communications between clients and the organizer. When a communication is issued from an organizer, each MX module connected to one or more clients participating in the collaboration ensures delivery of the communication to those clients. An MX module can support multiple virtual channels with a single physical connection or communication socket.

As described above, an organizer in collaboration server 110 handles one or more collaboration sessions, which may include virtually any number of attendees and may encompass one or more modes or topics. An organizer facilitates real-time distribution of information within all of its active collaboration modes, to all specified attendees. An organizer may be configured to record or archive some or all of the content for any or all collaboration modes. In one implementation, a recording module may act as a collaboration client.

Organizers maintain states for their attendees and modes, and also manage their attendees' (or clients') permissions. An attendee's permissions may be dynamically updated during a collaboration to indicate whether the attendee is permitted to make or receive changes to a shared desktop, a whiteboard or other object that is the subject of a collaboration mode. A permission may also indicate whether a particular client is to receive all communications updating a collaboration, some particular communications, whether an attendee may join some or all modes of a collaboration, etc.

In one embodiment of the invention, separate virtual channels are established between an organizer and each client participating in the organizer's collaboration. As described below, the organizer may include objects designed to read from and/or write to those channels in order to exchange data between the organizer and the clients. The MX modules ensure that each individual client receives the data, thereby relieving the organizer of the burden of actively handling individual client communications.

Figure 2:
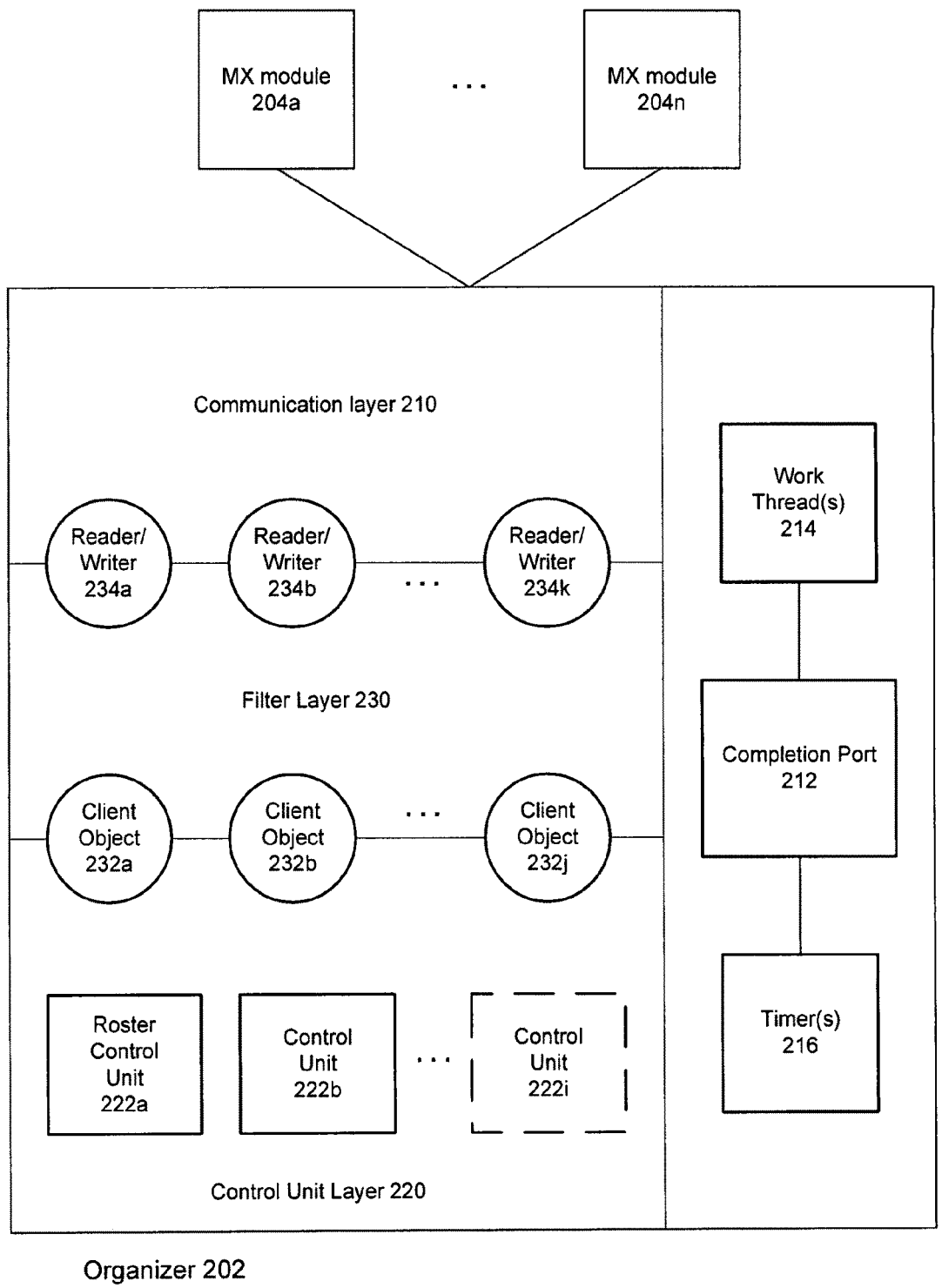
FIG. 2 depicts an organizer for managing one or more collaboration session, in accordance with an embodiment of the invention.

FIG. 2 is a block diagram of an organizer, according to one embodiment of the invention. Organizer 202 manages a collaboration having at least one mode and any number of attendees.

Attendees are connected to organizer 202 via one or more MX modules 204. As described above, an MX module routes collaboration communications between nodes. Thus, an MX module provides means for multiplexing many client connections to one organizer, and for efficiently distributing communications to multiple clients. Communications may be passed directly between an MX module and a client node, or indirectly through a proxy (e.g., a firewall) or other entity. Similarly, a client may connect directly to an MX, may be redirected from a web server, as shown in FIG. 1, or may need to connect via a proxy.

In different embodiments of the invention, an MX module may multicast a collaboration communication to its connected clients, may send the communication to each client in a peer-to-peer manner, or may disseminate the communication in some other manner.

Organizer 202 includes communication layer or API (Application Programming Interface) 210, which handles communications with clients through MX modules 204a-204n. Thus, the communication layer may include not only software executing on organizer 202, but also corresponding software executing on individual clients or other nodes that communication with organizer 202. Control unit layer 220 includes control units for controlling individual modes of a collaboration. Filter layer 230 filters interaction between control units and communication layer 210.

Also within organizer 202, completion port 212 allows the organizer, or an entity operating in any layer of the organizer, to schedule and/or learn of an event (e.g., completion of a task). When a task is completed, such as an outgoing communication is delivered, or an incoming communication is received, notification is made through completion port 212. Every layer of organizer 202 may interact with communication port 212, work thread(s) 214 and/or timer(s) 216. In addition, other modules or entities in a collaboration server may use an organizer's completion port.

Work threads 214, in the embodiment of FIG. 2, may comprise one or more thread pools for handling events received through completion port 212 (e.g., scheduling or queuing communications within a collaboration). Different pools or sets of threads may be associated with different control units. Work threads may block as long as no events are waiting to be dequeued from the completion port. When an event or task is received through completion port 212, a work thread 214 is spawned or woken to handle it. In this embodiment, rather than spawning a thread for every client coupled to organizer 202, threads are shared and may handle a variety of events or tasks.

An event initiated by a module within the organizer (e.g., a control unit) may have two parts: a request and a completion notification. Many events may involve the dissemination of collaboration information among clients (e.g., a change to a shared document, desktop or other collaboration object). Thus, the request portion of an event may include passing the event to communication layer 210 for processing. When the event is completed (e.g., all targeted clients have received the disseminated information), the completion port notifies the initiator of the completion.

In an embodiment of the invention, events are handled asynchronously. That is, the receipt, processing, completion and notification of different events may be intermingled. The status of every event need not be ascertained before another event can be initiated, and the status of each event active at a given time need not depend on the status of any other event.

In this embodiment, every event passed to a completion port from within an organizer has an associated programming object called a token. When the event is completed, the system invokes a method provided by the token in order to identify or locate the initiator of, or an entity interested in, the event (e.g., a control unit). The token may also embody the state of the event and uniquely identify the action(s) to be taken in response to completion of the event. This way, the initiator need not retain a plethora of state information regarding different events.

Timer(s) 216 may be configured to expire after a specified period of time. In an embodiment of the invention, the firing of a timer may be used to trigger the queuing or dequeuing of an event by the completion port, or invocation of a related token.

For example, a timer may be started when a communication (e.g., a data packet) is issued from a control unit for dissemination to one or more attendees of the corresponding collaboration mode. If all consumers have not reported receipt of the communication on behalf of their clients by a certain time, the timer may expire and some specified action may be taken (e.g., the communication may be dropped from any virtual channels on which it was not acknowledged).

Communication layer 210 may support multiple communication protocols. The communication layer (and/or some other entity in a collaboration server) may also support or provide data encryption, tunneling, compression and other communication handling.

Organizer 202 also includes control unit layer 220, which comprises one or more control units 222 (i.e., control units 222a-222i). Different control units control different collaboration modes. Thus, a web control unit may control a collaboration mode for sharing web content. A desktop control unit may control a collaboration mode for sharing an attendee's desktop. Other control units may be implemented for other modes, such as chat, polling, whiteboard, voice, etc. In alternative embodiments, more than one control unit may manage a collaboration mode, or one control unit may manage multiple collaboration modes. Control unit operations are described in more detail below.

Between communication layer 210 and control unit layer 220 is filter layer 230. Filter layer 230 is aware of which control units are implemented and active in organizer 202, and directs incoming communications (e.g., collaboration data from clients) to the appropriate control unit. Illustratively, the filter layer may determine which control unit should receive an incoming communication by examining the communication, or by extrinsic evidence.

In one embodiment of the invention, filter layer 230 provides an abstract representation of each client participating in a collaboration hosted by organizer 202. Such abstractions are represented in FIG. 2 as client objects 232. Because they represent interfaces with control units, they are depicted as straddling the boundary between control unit layer 220 and filter layer 230, but may be implemented in either or both layers.

A client object may act as a data provider when submitting a communication to the organizer as part of a collaboration, and/or act as a data consumer when receiving collaboration data on behalf of a client. Other entities within an organizer may also be represented by data consumers, such as a module configured to record a collaboration, a virtual client (described in a following section), and so on.

Other objects may be provided to read and write communications from/to clients' virtual channels. In FIG. 2, these objects are depicted as reader/writer objects 234, which serve as interfaces between communication layer 210 and the filter layer. One reader/writer may handle one or more virtual channels.

In one embodiment, an organizer receives a collaboration communication (e.g., a data packet) through the communication layer when a reader/writer object reads it from a client's virtual channel. A data provider corresponding to the client receives the communication and passes it to the appropriate control unit. The filter layer may verify the client's permission to send the communication to the control unit before the data provider takes action.

Conversely, when the control unit has a packet or set of data to send to a client (or multiple clients), it places it in a queue to make it available to clients. Each client's consumer will request the data when it is ready (e.g., after the client receives the previous set of data).

Each consumer may have a pointer into the queue to track which communication it will request next. These pointers may be updated by the control unit each time a client's consumer requests a communication or acknowledges the previous communication.

The filter layer (e.g., a client's data consumer) will instruct a reader/writer to write the communication on the appropriate virtual channel. The MX modules to which clients corresponding to the consumers are connected will ensure delivery of the communication to each client. In one alternative embodiment of the invention, the functions of a reader/writer object and a client object may be merged.

Outgoing data from a control unit may be cached (e.g., in a communication layer, in a filter layer) until it has been dispatched to all clients via their corresponding MX modules. A communication layer may send collaboration data to each MX module only once. Thus, in this embodiment, the amount of processing and communication activity within an organizer or control unit is proportional to the amount of collaboration activity, rather than the number of attendees, and may therefore scale quite well.

Organizer 202 may also include modules (not depicted in FIG. 2) for handling other tasks, such as database access, collaboration monitoring, logging or archiving, recording a collaboration mode, authenticating clients, authorizing a client's permission to send or receive a collaboration communication, etc.

In one embodiment of the invention, two or more levels of client or attendee authorization may be performed. For example, a first level of authorization may be carried out when a client connects to a real-time collaboration server to join a collaboration session or tries to join a particular collaboration mode. This level of authorization determines whether the client is allowed to join, and may be performed by a filter layer entity (e.g., an authorization module). If allowed, a corresponding client object is created for the client. As described above, the client object may contain data consumer and/or data provider objects, and may contain separate consumer and/or provider objects for each control unit that the corresponding client belongs to.

A second, more detailed, level of authorization may be performed within a mode of a collaboration. For example, different clients in one collaboration mode may have different abilities (e.g., to contribute data, to participate in separate discussions in a chat mode). This second level of authorization is therefore performed (e.g., by an individual control unit or client data consumer) when a client attempts to take some action within the mode.

One of the control units of each organizer (e.g., control unit 222a in FIG. 2) is a roster control unit, and maintains a roster of attendees participating in the organizer's collaboration. The roster control unit maintains state for each attendee/client and may also handle communications with clients regarding permissions and states (e.g., receives permission requests, sends permission grants).

In one implementation of the embodiment of the invention depicted in FIG. 2, one attendee at a time is the presenter for a collaboration mode. The presenter has control of the collaboration mode, and thus has permission to change a collaboration object—for example, to write on a whiteboard, to alter a shared desktop or document, etc. The presenter may grant others appropriate permissions, and may relinquish his or her role as presenter to another attendee.

In another embodiment, control of a collaboration object may be shared, so that multiple attendees may change or update it simultaneously or nearly simultaneously. However, changes may be assigned some serial order by the control units responsible for the collaboration modes in which the changes are made. This may make it easier to determine whether a particular attendee has received all events that he or she should.

When an attendee initiates an "event" (e.g., a change to a collaboration object), the attendee's client transmits the event to organizer 202 (through an MX module 204) via a virtual channel. The organizer (e.g., filter layer 230) receives the event and verifies that the sender has permission to initiate the event. The event is then passed to the control unit 222 corresponding to the collaboration mode in which the event occurred. The control unit processes the event and forwards it to some or all attendees of the collaboration mode, if necessary.

Different control units may receive events from, and distribute them to, different attendees or clients, depending on who is allowed to initiate events (e.g., by altering a collaborative document). In one implementation of the embodiment of FIG. 2, a roster control unit receives input from all attendees and can send communications to all attendees (e.g., to report the addition or departure of an attendee). A whiteboard, web, desktop or similar control unit may receive changes from the presenter of each collaboration mode and send changes to other attendees. A chat or polling control unit may also receive input from all attendees.

A communication layer, such as communication layer 210 of FIG. 2, provides reliable, full duplex, stream-based connections with clients (e.g., via virtual channels), and performs flow control on those connections. It serves as one endpoint to each virtual channel between a client and an organizer.

When an organizer's communication layer is initialized, all nodes that will use the communication layer register themselves and receive unique addresses or identities. Each client counts as a node, as well as each organizer and any other entities that will send collaboration data to, or receive collaboration data from, a control unit. When a new client connects to an organizer to join a collaboration session, it is registered and assigned a unique identity. Multiple virtual channels may be established between any pair of nodes.

A communication layer's connection to a client is reliable, in that the communication layer guarantees that data sent from one endpoint of a virtual channel will reach the other endpoint in the same order and without being corrupted.

Because an organizer's communication layer can call upon any number of MX modules to handle the distribution of an event, a collaboration server can easily scale to serve more and more attendees. The communication layer will not be over-burdened, because it need not separately transmit each event to every attendee (i.e., it may send an event to an MX module only once).

In an embodiment of the invention, a collaboration communication (e.g., an event from a client to an organizer, or vice versa) may be required to include two things—an identifier of the collaboration mode (or control unit) to which it belongs to (e.g., to facilitate routing of the communication to the correct control unit) and an approval value.

In this embodiment, the approval value of a communication from a client comprises a value that had been assigned to the client before it sent the communication. An approval value may facilitate authorization of a client's ability to send or receive a communication. For example, each approval value may be unique, and represent a particular client's authorization to send data within a collaboration or collaboration mode.

A client's approval value(s) may vary over time (e.g., as it gains and loses authorization to send data). Thus, while the client is approved to send events, it uses the last assigned approval value. When a collaboration server determines the client is no longer authorized to send data, that approval value is cancelled, and data communications from the client will not be accepted until a new approval value is assigned and used.

In different embodiments of the invention, or in different collaboration modes, a virtual channel between an organizer and a client may be packet-based or stream-based. In a packet-based virtual channel, each packet contains the approval value and collaboration mode identifier described above. In a stream-based virtual channel, the collaboration mode and approval value are identified when the stream is commenced. Thereafter, individual stream contents are not expected to re-identify the collaboration mode or approval value. For example, in a collaboration involving the exchange of voice data (e.g., in GSM format), it would be inefficient to include this information in every small data packet.

Figure 3:
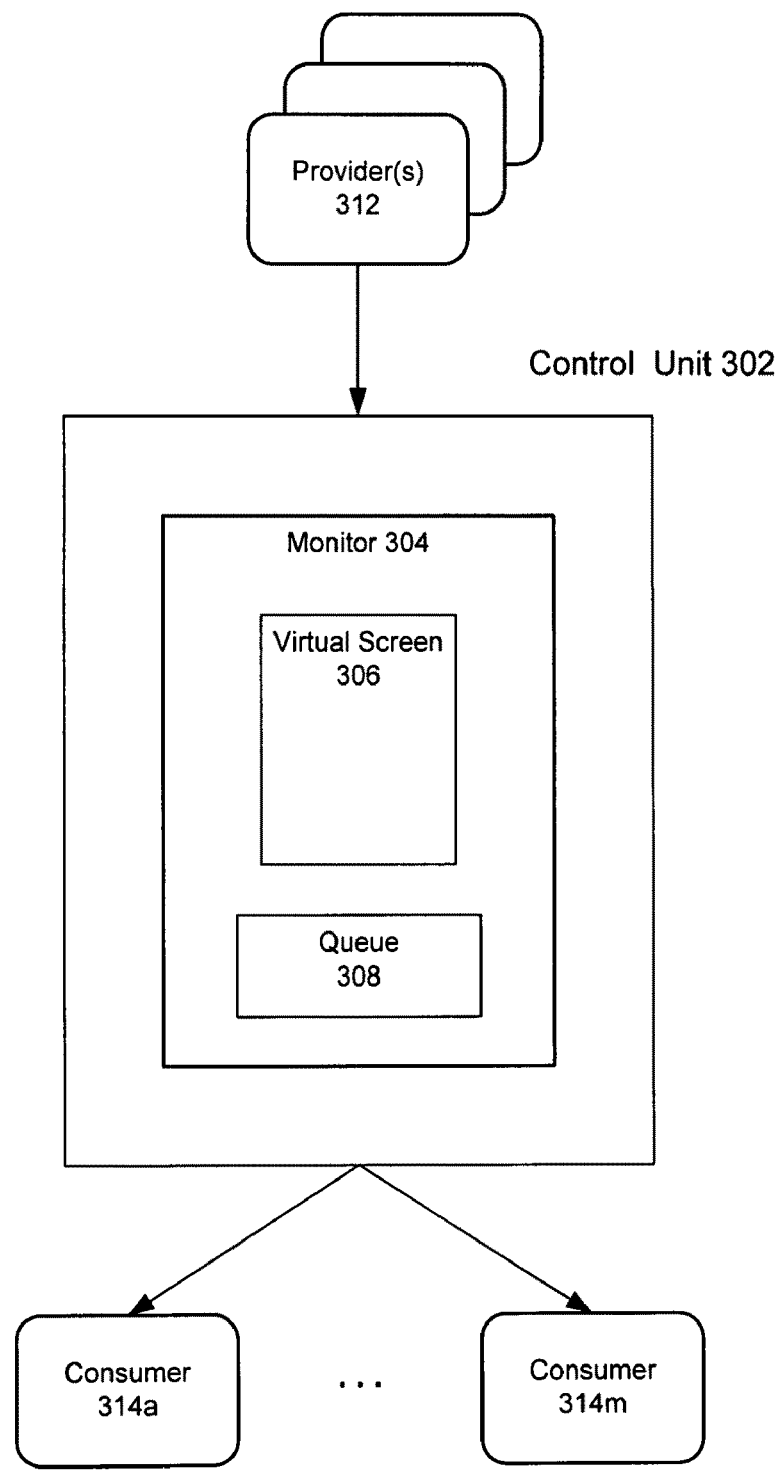
FIG. 3 is a block diagram of a control unit for controlling one mode of a collaboration, in accordance with an embodiment of the invention.

FIG. 3 depicts a control unit for controlling a collaboration mode, according to one embodiment of the invention. The control unit is responsible for controlling the flow and distribution of data within the collaboration mode.

In this embodiment, each control unit and collaboration mode operates virtually independently of any other control units and modes, and has a few primary tasks: receive and mix data (e.g., changes to shared desktops, shared whiteboards, chat sessions) from data providers, distribute data to consumers, synchronize new attendees with an on-going collaboration mode, support clients/attendees having various communication and processing capabilities, and so on.

In this embodiment, an organizer includes one or more data provider objects representing clients that may submit data during a collaboration session. The organizer also includes one or more data consumer objects representing clients that may receive data during the collaboration. Thus, a data provider may be seen as an abstract representation of any number of clients/attendees that may submit communications to an organizer or control unit. A data consumer may be seen as an abstract representation of one or more clients/attendees that may receive communications from an organizer or control unit.

In FIG. 3, control unit 302 controls a collaboration mode that requires input or changes from one or more data providers 312, and yields or disseminates output to one or more data consumers 314. The collaboration mode may be stateful, and each input may therefore be an incremental update to the previous state (e.g., until the mode is reset).

In control unit 302 of FIG. 3, monitor 304 maintains the state of the control unit's collaboration mode, and may store collaboration input and/or other events for dissemination. Thus, as described above, monitor 304 may implement a queue for collaboration data to be disseminated to clients.

And, as described in a subsequent section, a collaboration server (e.g., a control unit such as control unit 302) may maintain (e.g., in monitor 304) a current view or snapshot of a collaboration mode. This snapshot may be considered a virtual collaboration status or a virtual screen intended to mirror the information shared by a collaboration presenter. When a new attendee joins the mode while it is in progress, the view or snapshot can be used to facilitate synchronization of the new attendee with the mode.

In an embodiment of the invention, the speed or rate at which collaboration input (e.g., data) is provided to a control unit may not match the speed or rate at which the control unit can disseminate events to attendees. For example, client network connections may be capable of a wide range of maximum data rates, some clients may have less powerful processors than others, and so on.

If a data provider attempts to provide data to a control unit at a rate faster than all consumers can receive or retrieve traffic, some data may need to be buffered on the collaboration server. To prevent buffer overflow in the server, the production or acceptance of collaboration events may be suspended while previous events are disseminated. Or, the data and/or other events of a control unit needed by a particular (e.g., slower) client may be collapsed or condensed to allow the client to be brought up to date more efficiently, as described in a later section.

Thus, in one embodiment of the invention, an organizer's control unit layer or individual control units may limit the rate at which incoming changes or collaboration input are accepted, in order to align the rate of data receipt with the rate of data dissemination.

The role of a control unit, such as control unit 302 of FIG. 3, can now be described for different collaboration modes, as they may be implemented in different embodiments of the invention. One type of collaboration mode involves desktop sharing. In this mode, multiple attendees cooperate and share the state of the collaboration among their desktops. One attendee acts as presenter at a time—the attendee whose client desktop is being shared—and any number of attendees may participate. Every collaboration update comprises an update to the presenter desktop, or information enabling another client to replicate the update.

The state maintained by the corresponding control unit (e.g., in monitor 308 in FIG. 3) may include the current state of the desktop as a "virtual screen." When a new attendee joins the collaboration, the control unit sends the new attendee's client the virtual screen at a selected time, and a consumer may be added for the new client. Further, if a slow client was unable to accept collaboration events and data as fast as other clients, that client could receive updates at a slower pace. Such updates may be snapshots of, or updates based on, the control unit's virtual screen, or subsets thereof. Use of a virtual screen is described in more detail below.

Another type of collaboration employs a shared whiteboard. This mode may include multiple presenters and multiple other attendees. Every event may include a new drawing or drawing component (e.g., a vector, a polygon), a change to an existing sketch, a command to undo a previous change or to clear the board, etc. The control unit for the collaboration mode may maintain the current state of the whiteboard. New attendees may be synchronized as described above for a desktop sharing mode.

Another type of collaboration mode may encompass audio or other media sharing (e.g., voice, music, video). The presenter in this mode may be a server or other apparatus that retrieves or provides the audio input. Each portion of audio is disseminated to all participating attendees. The control unit for audio sharing may not record a state, as a new attendee may be satisfied with just receiving all audio generated after he or she joins. In this example, if an attendee's client could not handle the native data rate of the audio input, the control unit may discard audio data as necessary to accommodate the client's data rate.

A control unit may apply business logic and/or security logic to determine whether and when a particular attendee should receive a collaboration event (e.g., a change or update to a collaboration object such as a desktop or whiteboard). For example, attendees may require specific permissions in order to receive an event. A presenter of an event may identify an attendee that should or should not receive an event or set of events, and the control unit managing the collaboration mode will track that attendee's permission(s).

As described above, in one embodiment of the invention, every collaboration includes a "roster" collaboration mode, under the control of a roster control unit. The roster control unit deals with information that may affect an entire collaboration, not just one particular mode. For example, the roster control unit may manage the clients'/attendees' statuses as presenters and participants. This may entail managing their permissions to send and/or receive collaboration data and other events.

Figure 4:
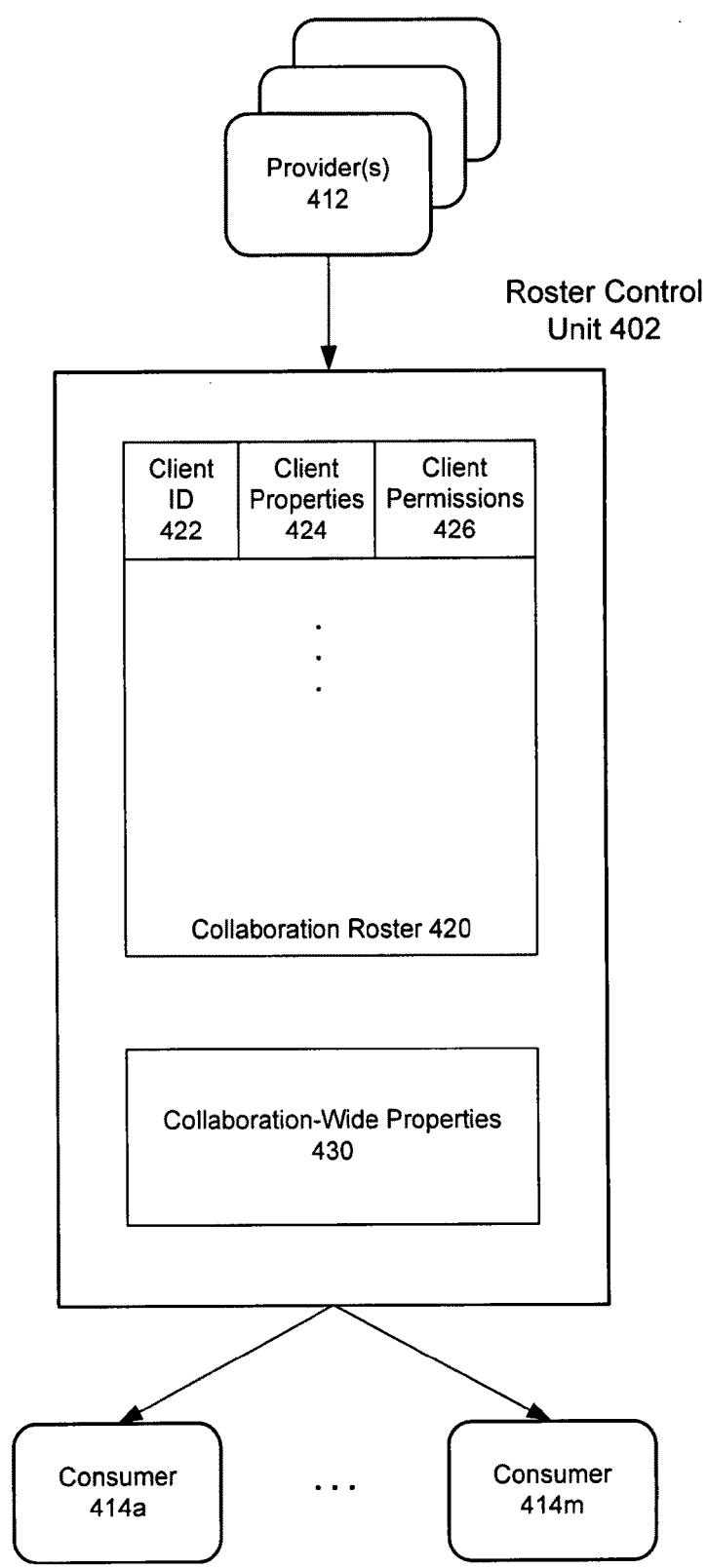
FIG. 4 is a block diagram of a roster control unit configured to maintain a roster of collaboration clients, in accordance with an embodiment of the invention.

FIG. 4 depicts a roster control unit according to one embodiment of the invention. In this embodiment, roster control unit 402 receives data (e.g., permission requests, state changes) from data providers 412, on behalf of any or all of the clients participating in a given collaboration. The roster control unit sends data (e.g., permission grants and denials, collaboration data, approval values) to data consumers 414 on behalf of their corresponding clients of the current collaboration.

Roster control unit 402 includes collaboration roster 420, which may be managed by a monitor module, as described above in conjunction with FIG. 3. Collaboration roster 420, when implemented in table format, includes a record for every client participating in the collaboration. Each client is identified by client ID 422, which comprises a unique identifier.

Each client's record also includes a set of client properties 424 and a set of permissions 426. Illustrative properties include a username, client location (e.g., IP address), indications of which collaboration modes the client's attendee is participating in, etc. Illustrative permissions include permissions to send data (e.g., changes to a shared collaboration object such as a whiteboard drawing or a desktop, a comment in a chat), receive data (e.g., for a specified collaboration mode), grant permissions to other attendees, etc.

In an embodiment of the invention, a permission comprises a permission identifier and a corresponding permission value. A permission identifier uniquely identifies a permission among all permissions applicable for all modes of a collaboration session. A permission value is a value (e.g., an integer, an alphanumeric value) indicating the status of that permission for the corresponding attendee or client. Illustratively, permission values indicate a status of Denied, Requested or Granted. If Denied, the attendee has been denied the permission; if Requested, the attendee was denied the permission, but has now requested it be granted.

If Granted, the attendee has been granted the permission. In this embodiment, when a permission is granted, the permission value comprises an approval value, which a client must submit to the collaboration server whenever it exercises the permission. When a once-Granted permission is subsequently denied, the assigned approval value becomes invalid.

Roster control unit 402 of FIG. 4 also includes collaboration-wide properties 430, which include properties of the overall collaboration. These properties may identify what collaboration modes are established, how many attendees are participating, which attendee is the presenter for each mode, a collaboration title or name, some configuration information, etc. In one embodiment, collaboration roster 420 includes collaboration-wide properties 430.

When a collaboration communication (e.g., an event, a change to a collaboration object) is received at a collaboration server, it is forwarded to the control unit that controls the operative collaboration mode. However, before the control unit processes the communication, the communication is examined to ensure that the sending client had permission to send it. Thus, the filter layer, or some other object or module, may examine an approval value included in the communication. In one embodiment, a client object (e.g., a data provider) representing the client from which the communication was received verifies the client's permission.

Illustratively, a collaboration roster or a separate verification module may be consulted to verify that the received approval value matches the client's current approval value. Illustratively, components of an organizer can access a collaboration roster without using the control unit interface that clients must use. Thus, when a client object needs to verify a client permission, it can query the collaboration roster directly.

Some communications may be accepted without verifying the sender's permission. For example, in a chat mode, all registered attendees may be assumed to have permission to provide input.

When the collaboration server prepares a communication to one or more collaboration clients, some or all clients' permissions to receive the communication may be examined by the filter layer (e.g., the clients' corresponding client objects) or some other object or module. However, in the interest of efficiency, some communications may be distributed without verifying permissions. For example, it may be assumed that all attendees registered to receive an audio stream, or other media stream, have permission to receive a normal portion of the stream.

From a control unit's point of view, a client's virtual channel can have one of two statuses in each direction (i.e., send and receive): blocked or ready. At any given time, the channel may be blocked in one or both directions because a communication (e.g., a packet) is being sent or received over the channel. If not currently busy, then the channel is ready to carry a communication to the client or receive one from the client.

In an embodiment of the invention, an organizer's completion port comprises what may be considered an I/O (input/output) event queue. As clients acknowledge receipt of communications from a control unit or organizer, and send communications to a control unit, the event queue is populated.

A control unit may maintain a queue, list or other structure for tracking communications dispatched as part of its collaboration mode. The control unit may maintain pointers, for each of its attendees' clients, to identify which communication(s) each client has or has not yet been sent or acknowledged.

When a communication is dispatched to a client, the operative reader/writer object may be marked as busy, and may not be returned to the ready state until an acknowledgement of the communication is received and processed. Illustratively, notification of the client's acknowledgement is received at the organizer's communication layer, through the MX module to which the client is connected. A work thread reads the notification and updates the sending control unit's status for the client.

Work threads may operate in cycles, and may sleep when there are no completion events to service. When the I/O event queue has an event to service, a work thread reads it and performs the necessary action. As described above, the event may include a token that specifies the action to be taken.

When a control unit prepares or receives a new communication to be sent to its attendees, it may immediately make the communication available to clients. It then releases the communication (e.g., passes a reference to the communication) to each client object when it requests the next data in the collaboration after having consumed the immediately preceding data.

When a control unit releases a communication for transmission to multiple clients close in time, the communication layer serving the control unit, and/or the MX modules to which the clients are connected, will try to optimize the transmission. Thus, the communication may be sent via multicast if possible.

Each MX module maintains a queue, buffer or other structure of the communications it has been instructed to transmit, and waits for the corresponding clients' channels to become ready to receive. When a client's virtual channel becomes ready to receive a communication, the MX module will transmit on that channel if it has anything for that client. A communication will be flushed from the MX module's buffer when all clients have received it.

Figure 5:
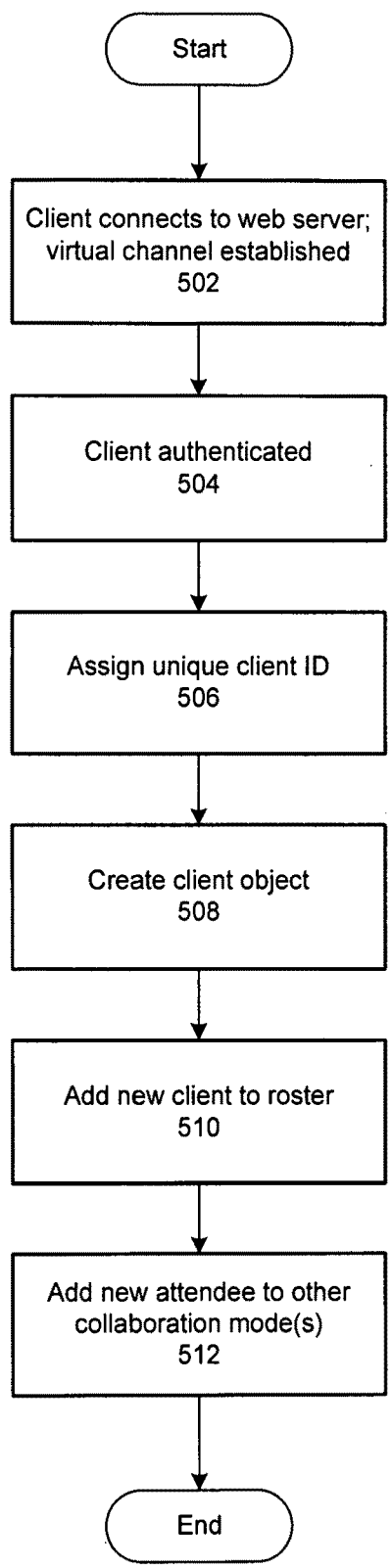
FIG. 5 is a flowchart illustrating one method of adding a new client to a collaboration, in accordance with an embodiment of the invention.

FIG. 5 demonstrates a method of connecting a new attendee to a collaboration session, according to one embodiment of the invention.

In state 502, a new attendee connects to a collaboration web server, through his or her client computing device (e.g., with a suitable browser). A listener in the web server accepts and forwards the connection to an available MX module. A communication layer of the organizer managing the target collaboration establishes or accepts a virtual channel between the organizer and the client.

In state 504, the client is authenticated, through PKE (Public Key Encryption) or other means. The organizer may include an authentication module configured to authenticate new clients.

In state 506 after the new client is authenticated, a unique client ID is assigned to the client.

In state 508, a client object is created in the organizer to represent the new client. As described above, a client object may reside in, or interface with, a filter (e.g., filter layer 230 in FIG. 2). The client object may include a provider and/or a consumer, to represent the client when it sends or receives communications to/from the organizer.

In state 510, the new client is added to a roster maintained by a roster control unit. Illustratively, the roster control unit creates a client record comprising the client's ID, any relevant properties associated with the client, any permissions the client is granted, etc.

In state 512, the new client is added to any collaboration modes the attendee requests or is assigned to (e.g., desktop sharing, whiteboard, chat, application sharing). The client's entry in the roster control unit is updated as the client's properties and permissions change, and is removed and/or archived when the client disconnects.

Figure 6:
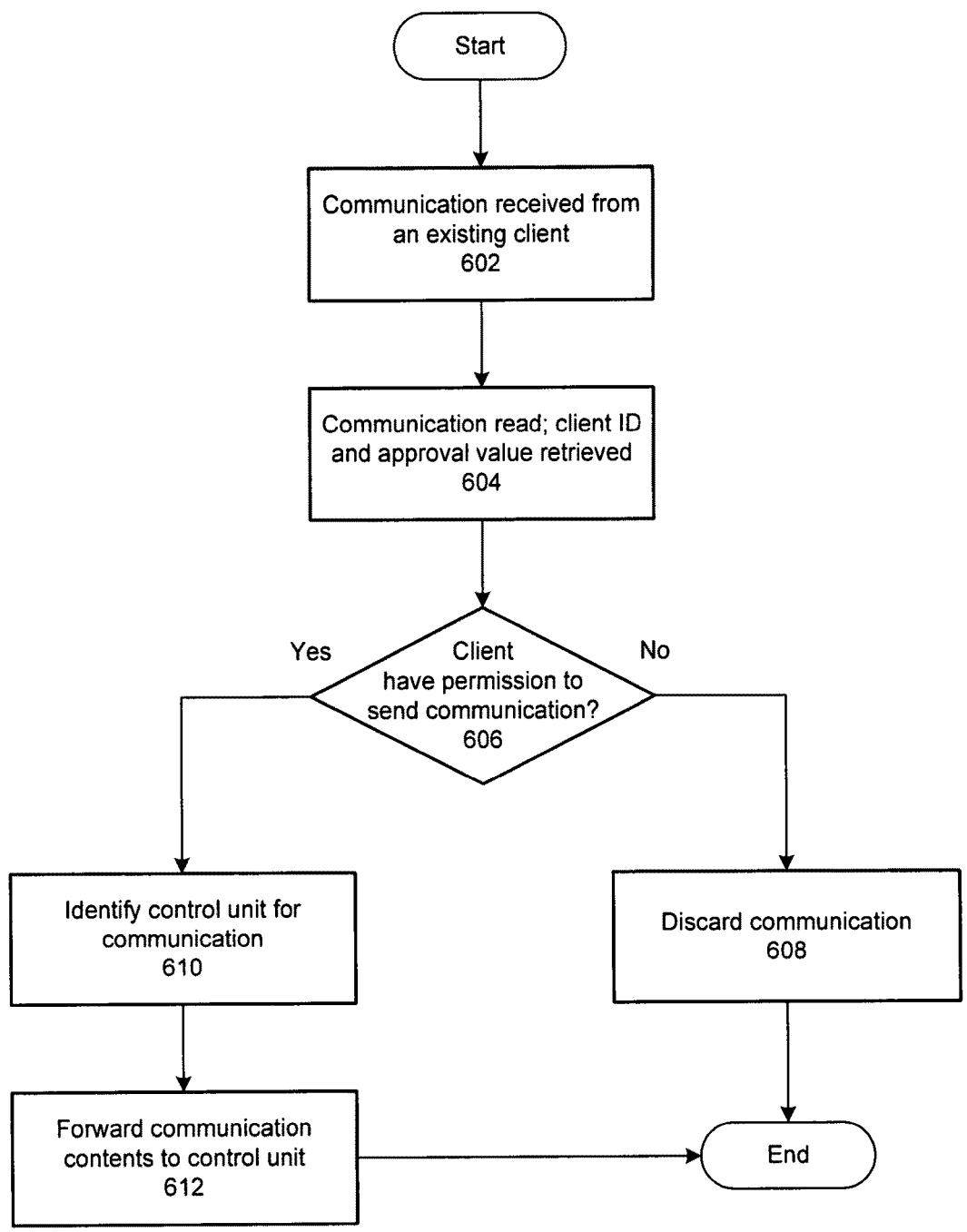
FIG. 6 is a flowchart illustrating one method of receiving a collaboration communication at a control unit from a client, in accordance with an embodiment of the invention.

FIG. 6 demonstrates a method of accepting data from a client participating in an existing collaboration, according to one embodiment of the invention. The data may comprise a change to a collaboration object (e.g., an update to a shared desktop, a modification to a shared whiteboard), a permission request, other state information, etc.

In state 602, a collaboration communication is received at a collaboration organizer (e.g., at the communication layer) from an existing client, over the client's virtual channel. In one embodiment of the invention, the communication is received by the client object that was created when the client joined the collaboration. In this embodiment, the client object acts as a data provider (to provide data to a control unit) when accepting data from its client. In another embodiment, reader objects are assigned to virtual channels to read communications received on the channels.

More specifically, a reader/writer object (e.g., within a filter or communication layer) may read the communication from the client's virtual channel. The reader/writer then passes the communication or its contents to the client's data provider.

In state 604, the communication is read from the channel, and the client's ID and approval value may be retrieved from the communication. The contents of the communication may be queued, cached or buffered.

In state 606, the sending client's authorization to send the communication is verified. The verification may be made based on the approval value retrieved from the communication. This action may require reference to a roster control unit, a verification module or some other entity within the responsible organizer.

If the client did not have authorization to send the communication, in state 608 the communication is discarded and the illustrated method ends. The originating client may be notified that it did not have permission to send the communication.

However, if the client had permission to send the communication, in state 610 the responsible control unit is identified. Illustratively, the corresponding client object or a filter may retrieve an identifier of the control unit (or the corresponding collaboration mode) from the communication. For example, the communication may include a type field that identifies the collaboration mode and/or control unit.

In state 612, the communication is forwarded to the appropriate control unit. In the illustrated method, the contents of the communication may first be received by the data provider (e.g., client object) representing the sending client. The provider notifies the control unit that it has data for the collaboration mode. When the control unit is ready, it requests or reads the data from the provider. When done receiving the data, the control unit may instruct the provider to retrieve the next communication or set of data from the virtual channel. When a virtual channel is quiescent, the corresponding client object is idle.

In response to the receipt of data from a provider, the control unit may disseminate the data to other attendees, may use it to update the state of a collaboration mode or the sending client, or take other action on the basis of the communication. For example, the control unit may queue the data for transmission to clients participating in the collaboration mode. When a client can receive the data, its client object (acting as a data consumer) may then request it. The illustrated method then ends.

Figure 7:
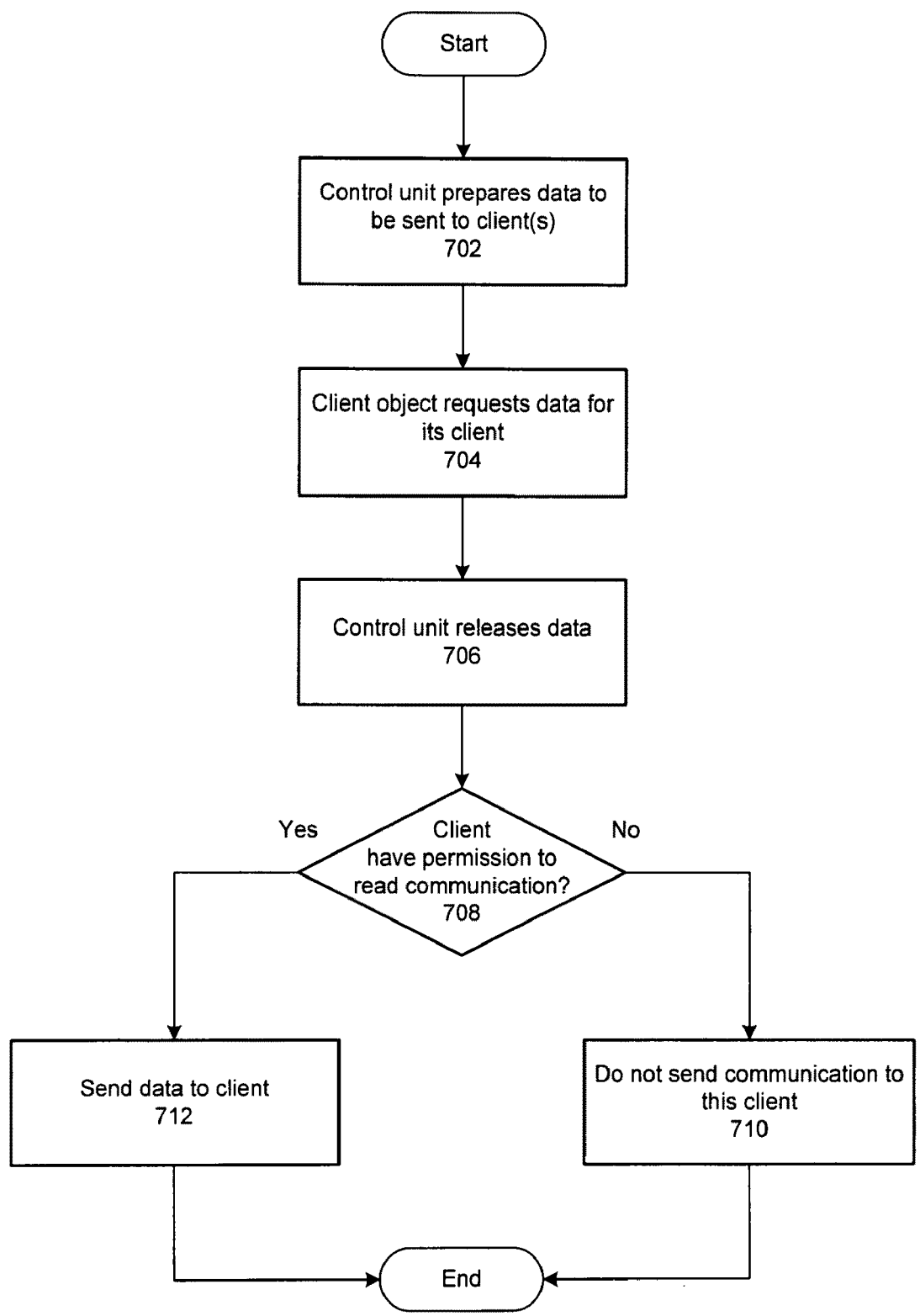
FIG. 7 is a flowchart illustrating one method of sending a collaboration communication from a control unit to a client, in accordance with an embodiment of the invention.

FIG. 7 demonstrates a method of transmitting data to a client participating in an existing collaboration, according to one embodiment of the invention. The data may comprise a change to a collaboration object (e.g., an update to a shared desktop, a modification to a shared whiteboard), a permission grant or denial, other state information, etc.

In state 702, a control unit for a collaboration mode assembles or prepares data to be sent to one or more clients. The data may have just been received from a presenter of the collaboration mode.

In state 704, a client object acting as a data consumer requests the new data be sent to its client. Illustratively, a number of client objects may request the data soon after it is queued. As described in a following section, the dissemination of data to clients may be controlled in order to manage the size of a control unit's output queue, handle slow clients, help synchronize clients joining a collaboration mode that is in progress, or for other purposes.

In response to a first request, in state 706 the control unit forwards the data to a filter or communication layer, where it may be cached until no longer needed (e.g., until it has been sent to all clients).

In state 708, a determination is made as to whether a consumer's client is permitted to receive or read the communication. This may require reference to a roster maintained by a roster control unit, a verification module within the organizer, or some other entity.

If the client is not authorized to receive the communication, in state 710 the client is dropped from the scheduled recipients of the communication, but it may still be sent to other, authorized, clients. A client may also be dropped from the list of recipients if the client has disconnected from the collaboration server or closed the virtual channel for the control unit's collaboration mode.

In state 712, the communication is forwarded to one or more authorized clients. Each data consumer may update a pointer or other reference to the control unit's queue, to reflect consumption of the latest entry. Similar to the reader objects described above, writer objects may be assigned to write communications onto virtual channels. Thus, state 712 may involve identifying the writer for a client's virtual channel and instructing that writer to send the communication. One object may comprise both the reader and writer for a virtual channel and, in one alternative embodiment of the invention, may also comprise the data provider and data consumer corresponding to the client connected to the virtual channel.

Desktop Sharing

In one embodiment of the invention, a collaboration mode involves sharing all or a portion of a presenter's desktop (i.e., contents of the display of a presenter's client computing device) with one or more collaboration attendees. In other embodiments, other types of data may be shared as described in this section.

In a desktop sharing mode of collaboration, an initial version or copy of the presenter's desktop is sent to the attendees' clients, followed by incremental updates. Thus, when the desktop sharing mode is initiated, the presenter's desktop (or a specified portion of it) as it appears at that time is reproduced on the attendees' clients.

Thereafter, changes or updates to the presenter's desktop are identified and sent to the clients in cycles. For example, a cycle may comprise a search for incremental changes, generation of corresponding primitives (including any necessary management of cached objects) and transmission of the primitives. Cycles may be initiated on a time basis (e.g., every 200 ms), in response to a threshold number of events that affect the desktop, after a number of presenter inputs, or on some other basis.

In an embodiment of the invention, updates and changes to the presenter's desktop are transformed into object primitives representing graphical objects or tools, and action primitives representing operations upon or using those objects or tools. The primitives are disseminated to attendees' clients so that they may reproduce the updates. Illustratively, the primitives are sent from the presenter's client to a real-time collaboration server, and from the server are disseminated to the attendees.

The primitives are designed to keep attendees' desktops very similar to (or exactly matching) the presenter's, while passing relatively small amounts of information. The information that is passed may be compressed and/or encrypted. Illustrative object primitives (e.g., drawing objects) are listed in Table 1, and illustrative action primitives are listed in Table 2. Other object and action primitives may be employed in other embodiments of the invention.

TABLE 1

| Object Primitive | Description |
| --- | --- |
| Character | A connected one-color graphic pattern or shape |
| Cursor | Pointing cursor (e.g., for a mouse) |
| Image | Image data (may be encoded in a variety of formats) |
| Palette | A set of predefined colors |
| Region | An area of the desktop |

TABLE 2

| Action Primitive | Description |
| --- | --- |
| Character update | Draw a specified group of character objects at a specified location in the desktop |
| Image update | Draw an image at specified coordinates in the desktop |
| Source blit | Copy the identified portion of the desktop to a specified area |
| Tile | Fill a specified area with the specified tile pattern |

Some or all object primitives may be cached for reuse, in a cache that is replicated from the presenter's client onto the other attendees' clients. When an object is cached, a cache ID is assigned at the presenter's client and accompanies the object to the other clients. When a later action or operation using the same object primitive is dispatched to the other clients, it may include just the cache ID instead of the whole object. In one implementation, all objects may be cached. In another implementation images and/or other objects may not be cached.

Illustratively, the presenter's desktop, or the portion of it being shared with the attendees, may be logically divided into "clusters" that are scanned for object primitives and/or other patterns or attributes. For example, the shared desktop may be divided into fixed-size squares or rectangles (e.g., 16 pixels by 16 pixels). Not every cluster may be the same size or shape.

Each cluster may be scanned with a specified regularity (e.g., every 200 ms), whenever a display driver or operating system reports that the display has changed, etc. In one embodiment, a checksum may be computed on some or all clusters every cycle, and only clusters whose checksums differ between successive cycles may be scanned for changes.

One type of object primitive in Table 1 is a "region." A region may encompass the entire shared desktop or any portion thereof, and need not be contiguous. For example, all portions of the presenter's desktop that comprise only a background (e.g., the desktop "wallpaper") may comprise one region. Thus, a region is not necessarily a drawing object, but more of an area in which to apply one or more actions or operations (e.g., place a cursor, insert a graphical object). A region may be defined, in a region object primitive, by any suitable means (e.g., x and y coordinates, vectors defining the boundaries).

In one embodiment of the invention, regions are formed from clusters after they are analyzed. More specifically, when a cluster is analyzed, various attributes are assigned to or associated with it. Such attributes may include the number of colors in the cluster, the number of pixels of each of those colors, a ratio of the number of pixels of one color to the number of pixels of another color, etc. Depending on the analysis of a cluster, it may be determined that the cluster contains a particular type of object (e.g., character, cursor, image).

Clusters having the same or similar attributes (e.g., same colors, almost the same ratios of pixels of different colors) may then be merged to form "regions." In another embodiment of the invention, regions are pre-defined, and may or may not be used in place of clusters.

A "palette," in this embodiment of the invention, also is not a drawing object. A palette comprises a set of colors that may be used to describe a character, image, or cursor to facilitate its reproduction on attendees' clients. A palette may identify any number of colors.

Illustratively, the system may attempt to match each set of colors encountered in a cluster with a palette. If a palette with the same colors does not already exist, it may be created. Or, if the colors are a subset of an existing palette, that palette may be associated with the cluster.

By predefining one or more palettes on the attendees' clients, colors of objects in the presenter's desktop can be described with less data. Instead of having to send the RGB value of each pixel of an object, for example, each pixel can be described with an index into the appropriate palette. And, a palette may be defined to include just those colors actually being used in the desktop or a region of the desktop, rather than the full color depth.

A "character" object primitive is not necessarily a member of the set of alphanumeric characters. In this embodiment, a character may be any connected pattern of pixels having a single color. Thus, within a scanned region, any uni-color pattern of pixels different from the background color may be defined as a character. Such patterns may include an alphanumeric character, a portion of an alphanumeric character (e.g., if the boundary between two adjacent clusters intersects the character), a symbol, a one-color figure (e.g., an icon), etc.

A "cursor" object primitive may be the cursor of a mouse (or other pointing device), of virtually any shape. By defining a presenter's cursor as an object primitive, the cursor can be correctly and easily placed by caching the cursor object and simply specifying the position at which to draw the object. To fully define a cursor object, its image data (e.g., shape, color), its size and its hotspot coordinate (i.e., location) are noted. The hotspot coordinate may be used to track the cursor as it moves.

An "image" object primitive may comprise any graphical content that isn't a "character," "cursor" or other already defined object. An image primitive may be encoded in virtually any manner (e.g., according to any coding scheme) for dissemination to attendees.

In one embodiment of the invention, a separate cache is maintained on the presenter's client, and reproduced on each attendee's client, for each type of object primitive (e.g., character, cursor, palette). Whenever an object primitive is first sent from the presenter's client, it is accompanied by its ID in the corresponding presenter cache. An attendee's client adds the new primitive with the specified ID. In this embodiment, the client may only discard a cached item when specifically instructed to do so (e.g., by the presenter client, by a collaboration server).

Besides one or more caches of object primitives created by a presenter's client, a surface cache used by the presenter's operating system may also be replicated at the other clients. Thus, when the presenter's operating system employs a graphical object (e.g., an icon) from its surface cache, the object and surface cache ID may be passed to the other clients so that they can reproduce the surface cache being used for the shared desktop. Parts of a surface may be sent (e.g., on demand); the entire surface need not be sent at once.

Regarding the action primitives of Table 2, according to one embodiment of the invention, "character update" action primitives may be used to draw character object primitives on attendees' clients. A character update identifies a set of character object primitives (e.g., by their cache IDs) and their positions relative to, or within, a particular region. All characters in one set may be of the same color. When the character update primitive is executed, the specified set of characters is drawn at the specified location.

Illustratively, the position of each character in the set may be defined by horizontal and vertical offsets (e.g., from the previous character in the set). For example, the horizontal offset may be measured from one boundary (e.g., the rightmost point) of the previous character, and the vertical offset may be measured from another boundary (e.g., the bottommost point). The first character may be defined as an offset from a specified point (e.g., (0, 0)).

An "image update" primitive may comprise a reference to (e.g., a cache ID of) a region of the presenter's shared desktop, image data to be placed in that region (e.g., an image object primitive), and any information needed to unpack or decode the image data. At each attendee's client, the image data are unpacked and the image is reproduced in the specified region.

In this embodiment, a "source blit" action primitive is used when content within the presenter's desktop is copied or moved from one position to another. This often occurs when a window is moved or the contents of a window are scrolled. A source blit in this embodiment identifies one or more regions (e.g., by coordinates) and an offset representing how/where the content moved.

When a source blit is identified during the analysis of the presenter's desktop or received from an operating system or display driver, a region may be defined to fit the content that moved, in which case only one region must be identified. A reference to the content (e.g., a cache ID of a region) is transmitted, along with the offset by which it moved. The receiving clients locate the specified content, which is already displayed and move it appropriately.

A "tile" action primitive may be used to facilitate replication of a repeating pattern in the presenter's desktop. For example, one region object primitive may be defined to comprise a target region of the desktop (e.g., a rectangular area) that has the same content or appearance (e.g., the same wallpaper or background). This target region need not be contiguous. Then, a tile (e.g., a cluster, a defined region) containing the same content is identified and used repeatedly (e.g., "tiled") over the targeted region.

In an embodiment of the invention, one or more object and/or action primitives are assembled to form a primitive block, one or more primitive blocks are assembled to form a media block, and one or more media-blocks are transmitted as a single desktop packet from the presenter's client. A media or primitive block may be compressed (e.g., according to zlib, LZ, or some other algorithm).

Figure 8:
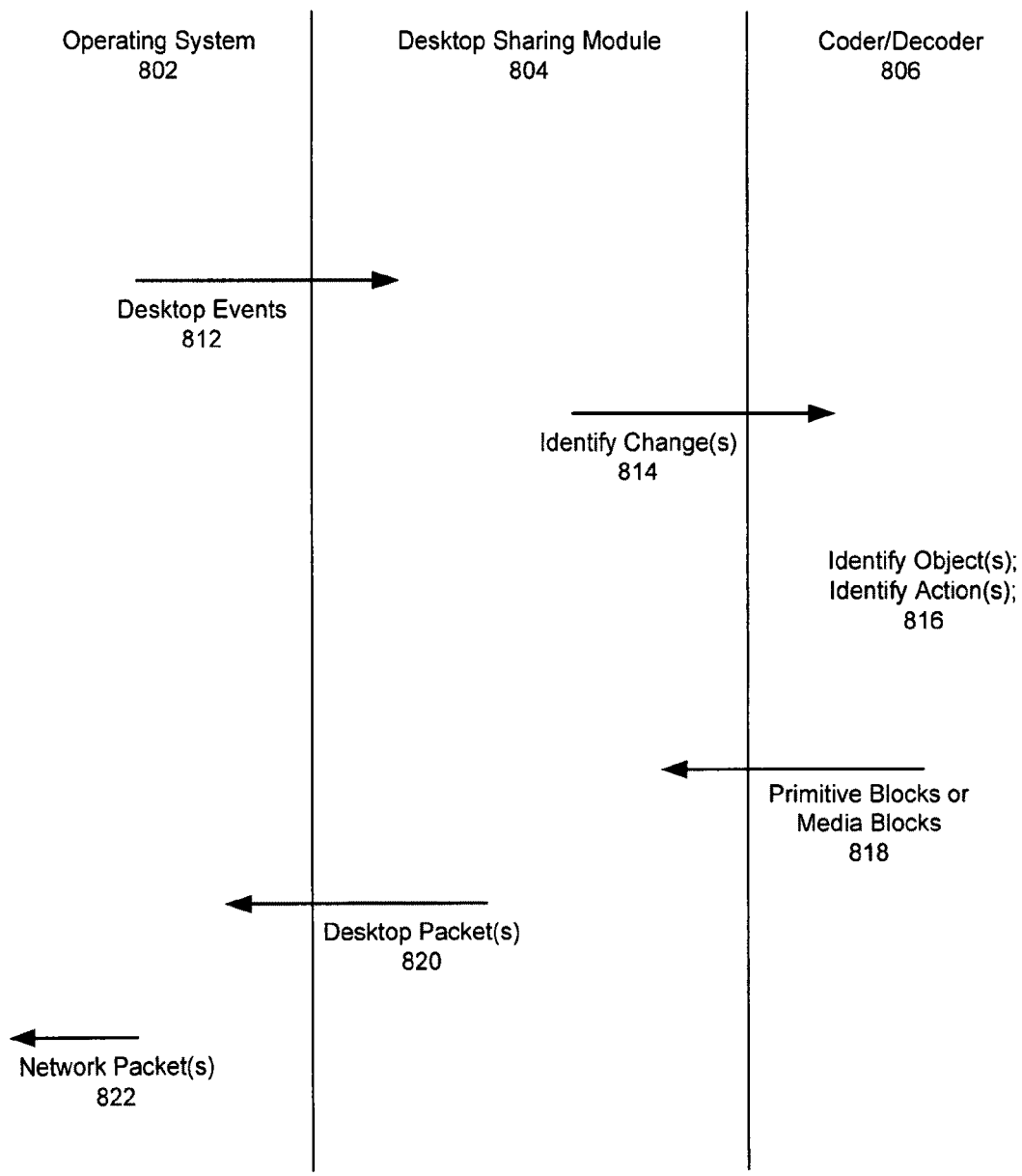
FIG. 8 demonstrates the process of updating a shared desktop, according to one embodiment of the invention.

FIG. 8 depicts a presenter's desktop sharing environment as it may be implemented in one embodiment of the invention. In this embodiment, to share the presenter's client desktop (or a portion of the desktop), the client executes operating system 802, desktop sharing module 804 (e.g., an application or utility) and codec (coder/decoder or compressor/decompressor) 806. The presenter's coder/decoder will act as an encoder or compressor. Attendees' clients will be configured similarly to the environment of FIG. 8, but their coder/decoders will act as decoders.

The portion of the presenter's desktop (the "shared" desktop) that is reproduced for collaboration attendees is referred to herein as the "bound" area or portion of the desktop. The codec is informed of the size (e.g., dimensions) of the shared desktop and the position of the bound portion. The shared desktop and the bound area are dynamic during a collaboration.

As shown in FIG. 8, the operating system (e.g., a display driver) may notify desktop sharing module 804 when the desktop is altered. This may commence a desktop sharing cycle as described above.

Notifications from the operating system may be made in the form of event(s) 812. An event may be fired when window is opened or moved in the bound area, an icon is selected, a cursor moves or the appearance of the bound area changes for some other reason or in some other way. In another embodiment of the invention, module 804 may commence a cycle on its own initiative.

When a cycle is commenced, desktop sharing module 804 informs codec 806 by passing it various information, 814, that will allow the codec to identify any changes in the desktop (e.g., to identify any objects that changed, and the actions involved).

Thus, the desktop sharing module may pass a description (e.g., the coordinates) of the bound portion, a description or definition of a region in the bound portion that changed or that encompasses the change(s), a new cursor position, a cursor image, a description and position of a window that moved, a set of data defining a character or image, etc.

In one embodiment of the invention, desktop sharing module 804 may receive source blits directly from a display driver, and pass them to the codec. And, as described above, module 804 may perform checksums on desktop clusters. The contents of any clusters that have changed may be sent to the codec as raw data (e.g., the values of the individual pixels in the cluster).

From the information provided by the desktop sharing module, codec 806 identifies the individual object and action primitives to be passed to other clients to allow them to reproduce the change(s). For example, within a set of clusters received from or identified by module 804, codec 806 may identify a set of character objects. It will create corresponding object primitives describing or defining the objects (if not already cached), and cache them. It will also create a suitable set of action primitives (e.g., character update primitives) to fill the object primitives with the correct color.

Thus, from data received from desktop sharing module 804, codec 806 creates higher-level object and action primitives. The codec assembles and returns one or more primitive blocks or media blocks 818, containing those higher level primitives, to the desktop sharing module. Codec 806 may include the ability to compress primitives, generate media blocks and streams, etc.

The desktop sharing module assembles media blocks into desktop packets 820 and forwards them to the operating system for transport. The operating system, or an applicable communication protocol stack, constructs network packets 822 to forward the desktop packets toward the attendees.

As described in a previous section, the desktop packet(s) may be transmitted to a real-time collaboration server, where they may be routed to a control unit responsible for controlling the desktop sharing mode. The desktop packet(s) may then be redirected or repackaged for dissemination to the attendees' clients. At the attendees' clients, the media blocks are inflated to retrieve the primitive blocks.

Thus, codec 806 produces the necessary primitives to be sent to attendees' clients to allow them to reproduce the bounded region of the presenter's shared desktop.

In one alternative embodiment of the invention, operating system 802 or desktop sharing module 804 includes a display driver layer, or the presenter's desktop environment includes a display driver layer between the operating system and the desktop sharing module. In this embodiment, the display driver layer may perform various functions.

For example, this layer may optimize source blits by focusing on the beginning position and ending position of the content that moved or scrolled. Intermediate positions need not be reported to other clients. A display driver layer may also perform the comparison of a cluster's present checksum with a previous checksum to identify clusters that changed.

And, the display driver layer may trim or shrink a region identified as having changed. Illustratively, when a set of clusters comprising one or more changes to the presenter's desktop is identified, the display driver layer may redefine the region of actual changes. The resulting region may not exactly align with cluster boundaries, but will be smaller in area.

In one embodiment of the invention, zlib compression is used to compress media blocks in a desktop packet. The compression is stream-based; a compressor (the presenter's codec) compresses media blocks, and an inflator (an attendee's codec) inflates them. Zlib compression is also stateful. That is, the inflator maintains a state for the decompression and, in order to inflate a mid-stream media block, the inflator must have inflated all preceding media blocks in the stream.

Ordinarily, this would make it difficult to add a new attendee after a desktop sharing mode of collaboration was initiated, because the new attendee's inflator would not have the current state. And, it would be inefficient to send every new desktop sharing attendee all the preceding data.

Therefore, in one implementation of this embodiment of the invention, the presenter's encoder inserts a media sync modifier between media blocks. The media sync modifier may be inserted every X media blocks, or with a particular periodicity, or at some other interval. When an inflator encounters a media sync modifier, it resets its state. Therefore, any set of media blocks delimited by a pair of media sync modifiers can be decompressed independently of any other media blocks. In this implementation, new attendees to a desktop sharing mode may be brought into the collaboration to coincide with a media sync modifier.

In an embodiment of the invention, a presenter's client may support multiple zlib streams of media blocks. For each stream, an attendee's client will maintain a separate inflator, each of which will maintain an independent state. Stream-specific media sync modifiers will reset different streams, and a full media sync modifier may be provided to reset all streams.

In one embodiment of the invention, media blocks are segregated into different streams based on the type of object primitives or action primitives they contain. Other criteria may be used in other embodiments.

Illustratively, except for media sync modifiers, every media block sent by a presenter comprises one or more compressed primitive blocks. A media block also has a header identifying its zlib stream or channel, and the amount of data in the media block. In one embodiment, seven zlib streams of compressed data and one stream of uncompressed data are supported.

The presenter's encoder multiplexes media blocks from the zlib streams into a single data stream transported to the attendees' clients as desktop packets. A decoder at an attendee client analyzes the data stream, one media block at a time. A media sync modifier will cause one or more inflators to be reset. Otherwise, based on the type of media block (e.g., the zlib stream), it is fed to the appropriate inflator. Then the individual primitive blocks are retrieved, parsed and executed.

Illustratively, a media sync modifier is created by a presenter's encoder on a configurable schedule (e.g., every ten seconds). A media sync modifier may comprise an uncompressed media block containing a header but no primitive blocks. The header identifies one or more streams or channels. An attendee's client will recognize the structure of the media sync modifier and reset the identified stream(s). The encoder resets its stream(s) after generating the media sync modifier. Resetting a stream may have the effect of stopping the deflator or inflator for that stream and restarting it or invoking a new one.

In one embodiment of the invention, a presenter's desktop sharing module communicates to a codec changes to the bound area of the shared desktop by describing to the codec the composition or appearance of one or more clusters. In this embodiment, the desktop sharing module may describe changes to the codec in terms of these clusters. A cluster may be defined to be any useful size and shape (e.g., sixteen pixels by sixteen pixels square). Irregular shapes are allowable, and a cluster need not comprise a single contiguous portion of the shared desktop.

In different embodiments of the invention, different methods may be used to find or identify or define a region of the presenter's desktop. For example, a region may be defined with a bitmap. Thus, a region within a sixteen pixel by sixteen pixel square area could be defined by a bitmap 256 bits in size (i.e., one bit for each pixel). Illustratively, a pixel is given one value (e.g., zero) if the pixel is not part of the region being defined, and a different value (e.g., one) if it is part of the region. Thus, a bitmap may be used to define or identify the pattern of a character within a cluster or other area. As described above, an action primitive may specify an action to take with regard to that region (e.g., fill it with a color).

Another method of representing a region may employ horizontal or vertical scanlines. As this method might be applied for horizontal scanlines, each scanline has a specified height (e.g., in pixels), which may vary from scanline to scanline, and may extend the entire width of the shared desktop or bound portion of the desktop, or less than the entire width. Successive scanlines are adjacent (i.e., from the top to the bottom of the screen, or vice versa). Each scanline comprises one or more scans, with each scan being limited to identifying one rectangle or other object in a region.

The shorter the scanline height, the higher the resolution of the scanline representation and the more data needed to define the region. Thus, scanline representation may be better suited for a shared desktop comprising large rectangular regions. A bitmap representation may be more suitable for more detailed regions.

In one embodiment of the invention, a region (e.g., the desktop background) can be described to attendees' clients by defining the region (e.g., by coordinates, boundaries) in an object primitive and then executing an action primitive to fill (or tile) the region with the specified color (or pattern).

A region containing character object primitives may be defined as just the shapes of the characters. That is, the region may comprise just vectors or pixels defining the characters. That region may be defined in any suitable manner (e.g., scanlines, bitmap) in an object primitive, and be followed by an action primitive indicating which color(s) to use to fill the character regions.

An image object may be defined by bitmap, scanline, or virtually any other method. An image update primitive for reproducing the image primitive may include a value for each pixel in the image, wherein the value is the index in the palette of the color of the pixel.

Table 3 identifies primitive packets that may be used in an embodiment of the invention. As described above, the presenter's encoder assembles primitive packets into media blocks. Media blocks are transported from the presenter's client within desktop packets.

TABLE 3

| Primitive Packet | Description/Contents |
| --- | --- |
| Shared_Screen | Dimensions of shared desktop screen |
| Shared_Screen&Region | Dimensions of shared screen and bound area of the shared screen |
| Bound_Area | Dimensions of the bound area |
| Character | One or more character object primitives |
| Cursor_Image_BW | Defines a monochromatic cursor object primitive |
| Cursor_Image_Color | Defines a color cursor object primitive |
| Image | One or more image object primitives |
| Palette | One or more palette object primitives |
| Region | One or more region object primitives |
| Character_Update | One or more character update action primitives |
| Image_Update | One or more image update action primitives |
| Source_Blit | Defines a source blit action primitive |
| Set_Cursor | Instructs client decoder to set mouse pointer to specified cached cursor |
| Palette_Add | Colors to be added to specified cached palette |
| Surface_Add | Add item to surface cache |
| Mouse_Position_Abs | Current mouse position, relative to point (0, 0) of the shared desktop screen |
| Mouse_Position_Rel | Current mouse position, relative to previous mouse position |
| Mouse_Position_Hide | Instructs client decoder to hide the current mouse pointer |
| Drop_Cache_Item | Instructs client decoder to drop the specified item (or all items) from the specified cache (or all caches) |
| Viewport | Definition of recommended viewport into bound area; generally at least as large as the bound area, and no larger than the shared desktop screen |

In other embodiments of the invention, more or fewer primitive packets may be defined than are listed in Table 3.

Control Unit Operations

In present embodiments of the invention, a control unit may be configured to perform one or more specialized operations to facilitate a collaboration session.

In one embodiment, a control unit for controlling a desktop sharing, whiteboard, or other collaboration mode may maintain a "virtual client" for tracking the status of the collaboration (e.g., the appearance of a presenter's shared desktop, the contents of a shared whiteboard). The virtual client may, in particular, maintain a virtual in-memory image or representation of a presenter's or host's client desktop, including any caches, buffers or other objects needed to reproduce a shared desktop, whiteboard, etc. The collaboration status maintained by a virtual client may be termed a "virtual screen."

A virtual client may be maintained to help clients of attendees that join an in-progress desktop sharing collaboration quickly synchronize with the shared desktop. The virtual client thus acts like a regular client of the collaboration mode, in that it will receive the same data as the other clients, and apply the data to mimic the presenter's desktop.

In another embodiment, a control unit that has a slow client (e.g., a client that accepts or requests data at a notably slower rate than other clients in the same mode) may take some action to control the size of its output queue (i.e., the queue of collaboration data to be sent to its clients). For example, depending on how far behind in the collaboration the slow client is (e.g., how many packets or how much data are available that the client has not yet received), the output queue may be "collapsed" for this client. When a control unit's output queue is collapsed for a client, it is treated like a new client and is sent a copy of the control unit's virtual screen (if one exists for the collaboration mode) instead of trying to send it every separate set of data in the queue.

A Virtual Client

In one embodiment of the invention, a control unit may employ a virtual client to maintain a virtual screen for a desktop sharing collaboration mode, a whiteboard mode, or any other mode in which it is necessary or desirable to provide new attendees with collaboration data received by the control unit before the new attendees joined.

For example, in a desktop sharing mode, and as described in a previous section, changes to a presenter's desktop (or a shared portion of a desktop) may be sent as incremental updates. Clients may need to have received and processed previous updates in order to apply a new update if the updates are packaged using a form of compression or a desktop sharing protocol that is stateful. When a virtual screen is maintained by a virtual client within a desktop sharing collaboration mode, the virtual client will act almost identically to a true client. Thus, it will maintain caches for object and action primitives, apply any necessary decompression, reset media streams in response to media sync modifiers, etc.

In a whiteboard collaboration, new attendees may expect or want to see the whiteboard as it appears when they join, not just all changes made to the whiteboard after they join. In a chat mode, a new attendee may desire a summary of, or an extract from, a discussion that occurred before he or she joined. In a web co-browsing mode, a new attendee may wish to view some or all of the previously browsed pages. Other modes may also benefit from a virtual screen.

In a collaboration mode such as a whiteboard mode, a virtual client may not attempt to maintain a mirror image of what actual attendees' clients are displaying. Instead, it may just store copies of some or all collaboration data packets that updated the whiteboard. The state of the collaboration could be recreated at any time by applying those packets.

In one embodiment, a virtual client interfaces with a control unit queue using a data consumer object similar to the data consumer objects described previously for actual clients. The process by which the virtual client receives collaboration data is thus very similar to the manner in which actual clients receive the data. The virtual client, however, may be resident within the control unit, and therefore needs no virtual communication channel.

A new data packet from a client of the presenter or host is received by the responsible control unit through the data provider object corresponding to that client. The control unit queues the data for dissemination to other collaboration clients. For each client, a corresponding data consumer object maintains a pointer or reference into the control unit's queue to identify the most recent data it has requested on behalf of its client or the next data to be requested. The virtual client's data consumer does the same.

When a client (or the virtual client) is ready to receive new data placed in the control unit queue, the corresponding data consumer advances its pointer accordingly, and the control unit instructs the consumer to send the data to the client. When the virtual client for a desktop sharing mode receives a new data packet, it decompresses the packet, if necessary, and renders the data to update its virtual screen. For a whiteboard collaboration, the virtual client may just save the data (or the entire packet).

When a new client joins an ongoing collaboration mode that has an associated virtual screen, the control unit requests a copy of the virtual screen from the virtual client. A list of new clients may be maintained to identify all those that join before the virtual screen is received and sent to the new clients.

In response to a request for a copy of the virtual screen, the virtual client may act like a presenter of the collaboration mode does when it sends a first view of its shared desktop. That is, the full shared desktop, whiteboard, web page or other content is assembled (e.g., and compressed) for transmission, including any caches, scripts or other objects needed to reproduce the content. The process of assembling a copy of a virtual screen for a client joining a shared desktop collaboration mode may be termed "packing."

The virtual client signals the control unit when the virtual screen is ready to be sent. The control unit then instructs the new clients' data consumer objects to send the virtual screen to the clients. The new clients' data consumer objects are updated to point to the control unit queue entry corresponding to the most recent data included in the virtual screen.

A virtual client may receive multiple requests for a copy of a virtual screen while it is packing a copy. For example, after one new client connects to a control unit, others may also join before the first one is sent a copy of the virtual screen. The virtual client will continue with the copy it started making for the first new client; that copy may be sent to all the new clients.

In an embodiment of the invention in which a virtual screen is maintained for a desktop sharing collaboration mode, new clients may only be added to the collaboration at particular times. As described in a previous section, desktop sharing updates from a presenter may be packaged using stateful compression (e.g., zlib) and multiple media streams. Media sync modifiers may be added to periodically reset some or all of the media streams.

In this embodiment, a new client may only be added when all streams are reset. Illustratively, the presenter of a shared desktop collaboration mode may be configured to reset all streams (with an appropriate media sync modifier) on a predetermined schedule (e.g., every ten seconds, every five seconds).

When the virtual client that is maintaining a virtual screen for a shared desktop receives a request for a copy of the virtual screen, it may not begin packing the virtual screen until it receives and processes a media sync modifier resetting all media streams or channels. In one embodiment, a virtual client may automatically start or schedule the packing of its virtual screen every time it encounters a media sync modifier resetting all streams.

A virtual client may include a worker thread having three distinct states: idle, rendering and packing. When idle, the worker thread will immediately respond to a new data packet by rendering it, or respond to a request for a copy of the virtual screen by packing it. If a new data packet is received while the worker thread is in the packing state, it may finish making its copy of the virtual screen before rendering the new data. As described above, if the worker thread receives another request for a copy of the virtual screen while it is packing one, it may ignore the duplicate request.

In another embodiment of the invention, a virtual client may employ a thread provided by the organizer it which the virtual client resides. For example, in organizer 202 of FIG. 2, a virtual client operating in control unit 222b may call upon a pool of work threads such as work thread(s) 214.

While in the rendering state, it may be illegal for the virtual client to receive another new data packet. In particular, the virtual client's data consumer object may be configured to only consume a new data packet after the virtual client has finished the previous set of data.

In different embodiments of the invention, a virtual screen may be maintained synchronously or asynchronously. When a virtual screen is maintained synchronously, all new data are passed to the virtual client, and the virtual screen is updated, before the data are released to actual clients. The virtual client may not need a client object (e.g., a data consumer) in this scenario. When a virtual screen is maintained asynchronously, the virtual client receives access to new data at substantially the same time that other clients receive access. In a multi-processor environment, asynchronous maintenance may be more effective.

Queue Collapsing

In one embodiment of the invention, a control unit may collapse its data queue for a slow client, depending on the length of the queue, how much collaboration data the client has not yet received, and/or other criteria. By collapsing the queue, the control unit is able to restrain the size of the queue and prevent a slow client from affecting the rate at which other clients receive data. In addition, a slow client may be able to catch up to other clients faster than it could otherwise.

If a control unit did not collapse its queue, it could grow unbounded. This would consume memory resources and complicate queue management. If a limit were placed on the size of the queue, but the queue wasn't collapsed by the time it reached this size, then the rate at which other clients could receive collaboration data from the control unit would be limited by the speed at which the slowest client retrieved data.

When a control unit collapses its queue, a client at the tail end of the queue (i.e., at the entry representing the oldest queued data) is updated to the head of the queue, or at least nearer to the head. More specifically, the pointer used by the slow client's data consumer is updated, and any data that are no longer needed by any clients (e.g., data at or near the tail end of the queue) may be discarded.

In one method of queue collapsing, a virtual screen is sent to a slow client to update it to a position at or near the head of the queue. By packing and sending the virtual screen, the slow client does not need to receive any of the data between its former position in the queue and the entry representing the most recent set of data included in the virtual screen.

In this method, a control unit's queue size may be limited in size (e.g., approximately 1,000 entries) or the amount of data that can be queued at one time (e.g., 3-4 MB). When this size is reached, new data (e.g., from a data provider) cannot be added until one or more old entries are consumed by the client(s) that has/have not yet done so. However, there may be other times, when the queue is not yet at its maximum size, when it may be beneficial to collapse the queue.

In one embodiment of the invention, a "hard" queue collapse is effected when a maximum size of the queue is reached. In contrast, a "soft" queue collapse may occur when the queue is less than its maximum size, but it would be more efficient to update a slow client by sending it the virtual screen rather than sending every intervening set of data in the queue.

When hard queue collapsing is active, the queue must be collapsed when it reaches its maximum size, regardless of how many slow clients are working at the tail end of the queue. Illustratively, when a packet is added to the queue, its size is checked.

During a hard collapse, the slowest client (or clients if more than one are equally slow) will be busy receiving a set of data when the queue reaches its maximum size. That client is moved to a list of clients for which the system is waiting for a set of data to be delivered. When the slow client finishes those data and requests more, it will be moved to a list of clients (e.g., new clients) awaiting a virtual screen (described above). When a copy of the virtual screen is ready, it will be sent to all clients in the list, including the slow client.

The slow client's pointer into the control unit queue is updated to the most recent data included in the virtual screen. Any entries between the slow client's old position in the queue and the present position of the next slowest client can then be discarded.

In one implementation of this embodiment, the queue may not yet be at its maximum size, but there may be one or a limited number of clients at or close to the tail end. If a virtual screen is packed for a new client, the slow client(s) may be added to the new client list and the queue may be collapsed anyway.

When soft queue collapsing is active, the queue is examined whenever a client (e.g., the slowest client) requests another set of data. The queue may be examined to determine how much data would have to be sent to the client to make it current. This is compared to the size of the virtual screen, or an estimate thereof (e.g., the size of the virtual screen when it was last packed). If the virtual screen is smaller than the incremental data that would have to be sent, then the queue may be collapsed for the slow client.

Figure 9:
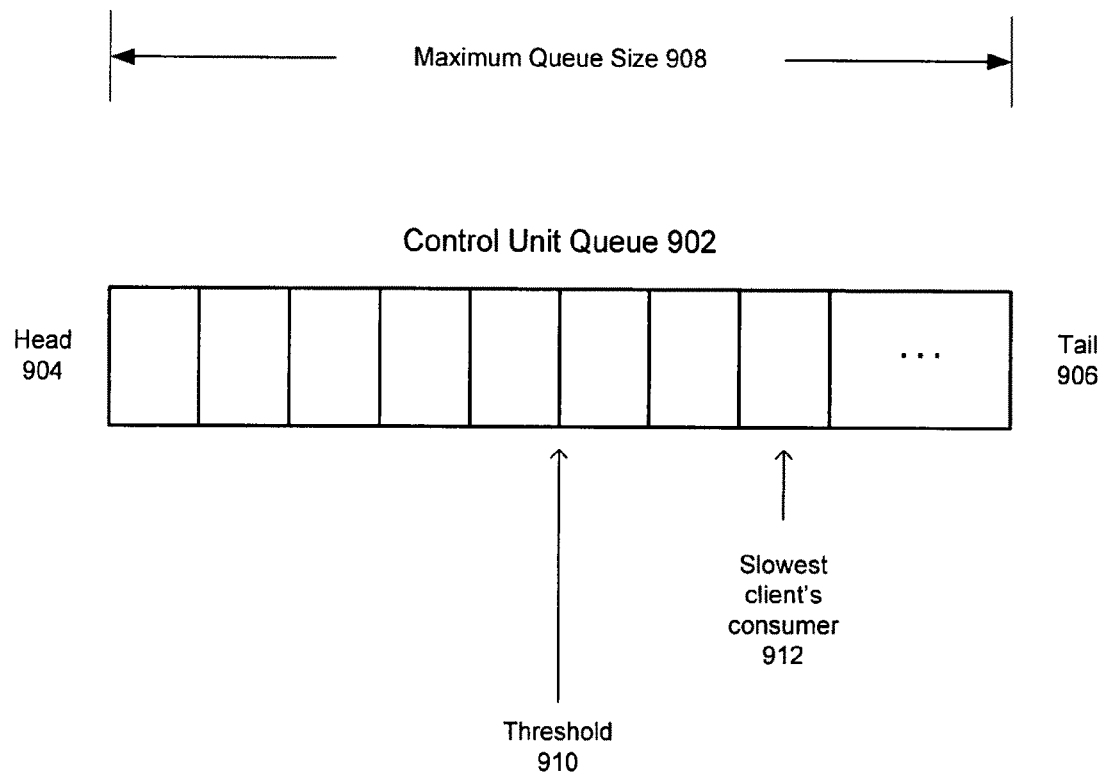
FIG. 9 depicts a control unit queue on which a form of queue collapsing may be performed, according to one embodiment of the invention.

FIG. 9 illustrates an embodiment of the invention in which soft queue collapsing may be performed. In FIG. 9, control unit queue 902 is the data output queue for a control unit configured to control a collaboration mode that employs a virtual client to maintain a virtual screen. Queue 902 has head 904, where new collaboration data are added for clients, tail 906 and maximum size 908. If the queue reaches its maximum size, hard packet collapsing may be automatically implemented.

In the illustrated embodiment of the invention, the size of a virtual screen is noted whenever it is packed (e.g., for one or more new clients). An initial estimate may be approximately 200 KB. A dynamic threshold, threshold 910 in FIG. 9, is defined (e.g., as a pointer) to identify the portion of the queue, starting from the head, that is substantially similar in size to the computed size of the virtual screen. The threshold may be updated when the virtual screen is packed and its size calculated.

Thus, for any clients that have not yet received all data between threshold 910 and tail 906, it may be more efficient to collapse the queue and send them a virtual screen. To this end, when a client (or just a slow client) requests a next set of data, the position of that next set of data in control unit queue 902 may be determined relative to threshold 910.

For example, the slowest client that consumes data from queue 902 may be currently receiving data from the queue entry at the position indicated by reference 912. When this client requests more data, the system may determine that it would be more efficient to pack and send the virtual screen Because it may be relatively expensive to pack a virtual screen, in one embodiment of the invention, a slow client may be updated by sending it a previously packed virtual screen instead of making a new copy. In this embodiment, when a (slow) client requests data from the control unit data queue, the system determines whether a packed virtual screen is available. Each packed virtual screen may be stored until another is created.

If a packed virtual screen is available, the system determines whether the virtual screen is smaller in size than the amount of data in the queue between the client's current position and the position of the most recent data included in the packed virtual screen. If so, a copy of that virtual screen is sent to the client.

Figure 10A:
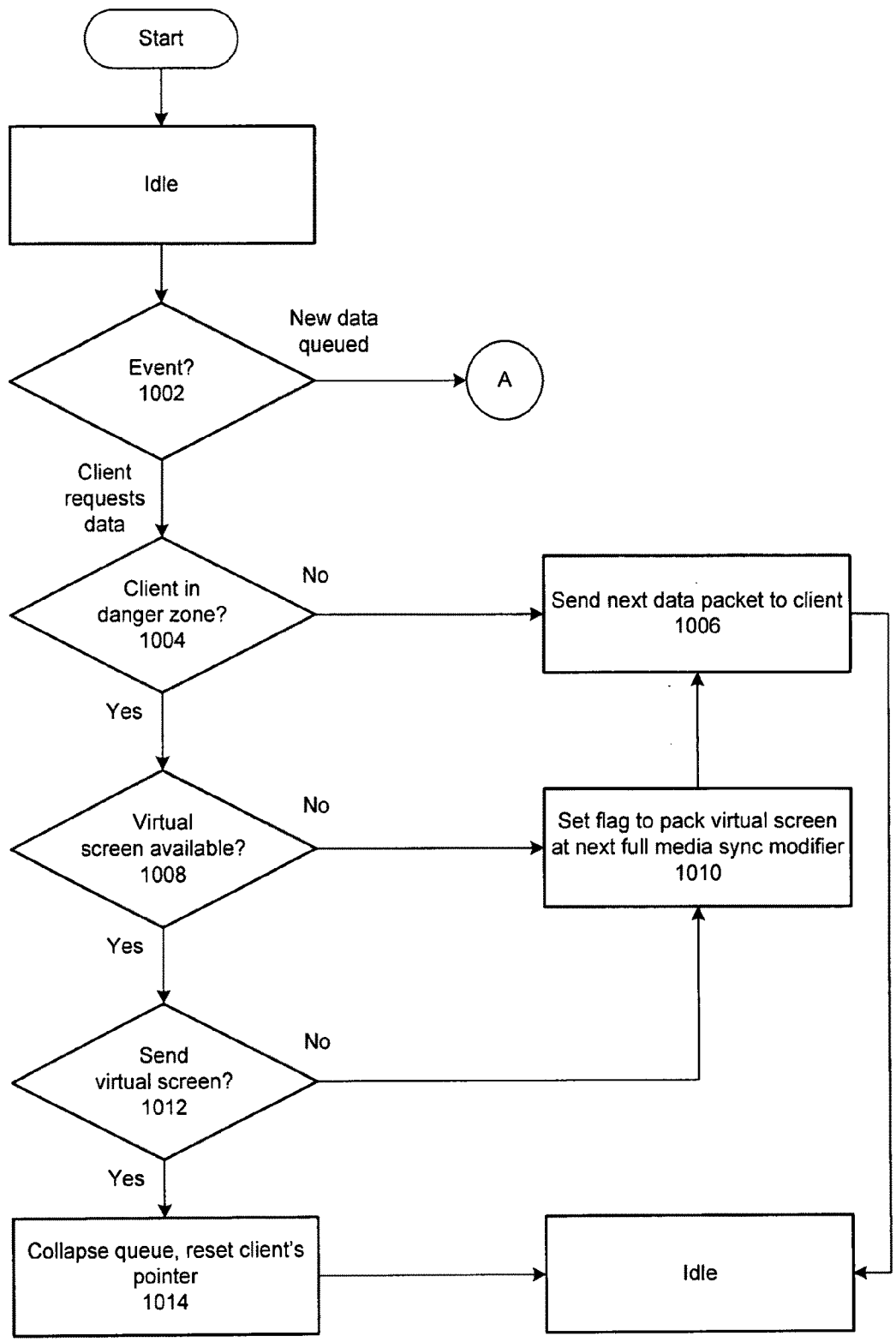
FIGS. 10A-B comprise a flowchart demonstrating a method of determining whether to collapse a control unit queue, according to one embodiment of the invention.
Figure 10B:
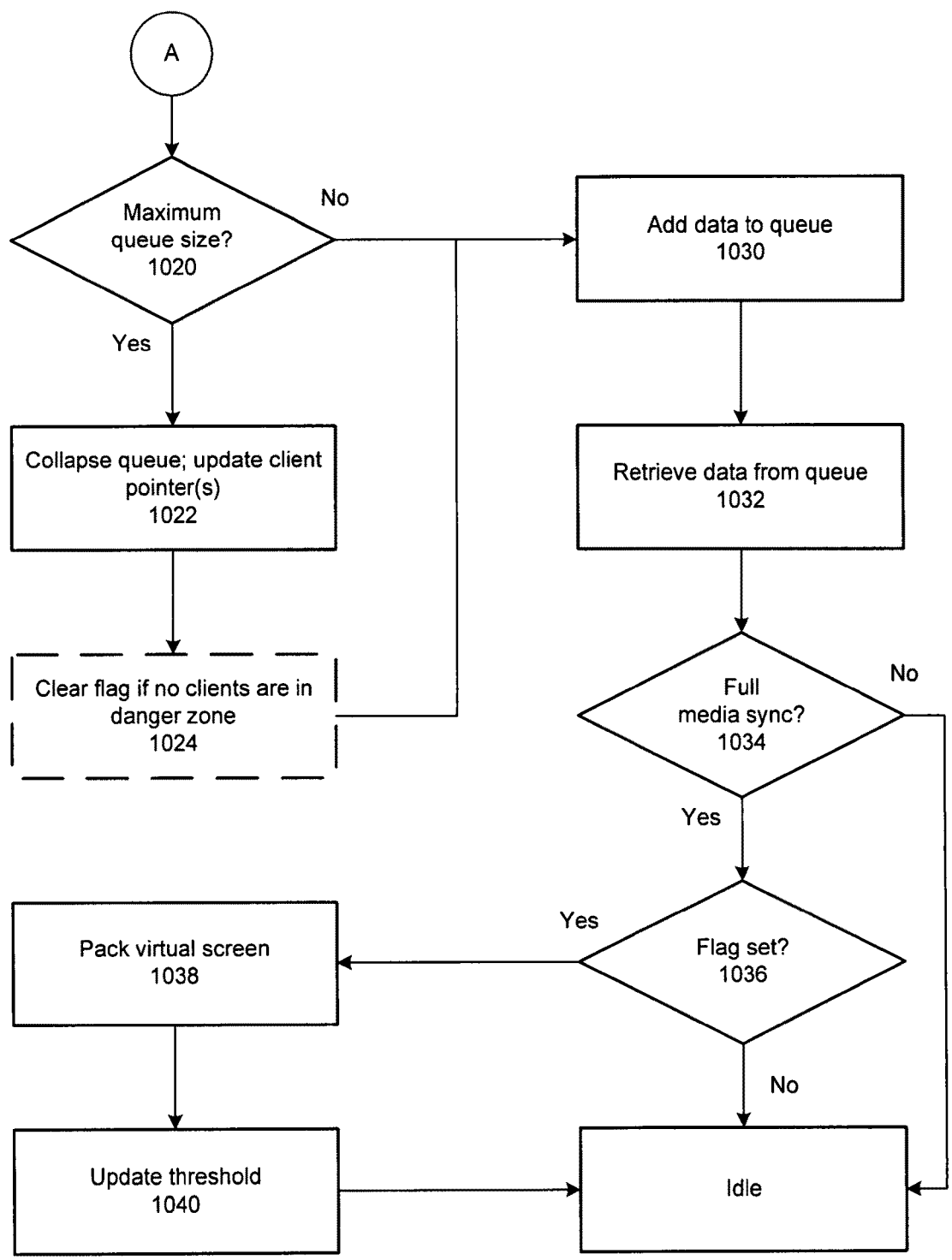

FIG. 10 demonstrates a method of performing hard and/or soft collapsing of a control unit queue according to one embodiment of the invention. The illustrated method begins with the queue being idle; it may comprise any number of entries containing or representing collaboration data.

In state 1002, an event occurs. In particular, either new data are received for the queue (e.g., from a client's data provider) or a client's data consumer requests more data for its client. If new data are received, the method advances to state 1020. Otherwise, the method continues at state 1004.

In state 1004, the control unit determines whether the requesting client is currently in the "danger zone." In the illustrated method, the danger zone comprises the portion of the control unit queue beyond the threshold described above. In particular, the threshold marks the queue location at which the queued data (from the head to the threshold) matches or is similar to the size or estimated size of the control unit's virtual screen. The danger zone comprises the remainder of the queue. If the client's data consumer is currently pointing to the danger zone, the method advances to state 1008.

Otherwise, in state 1006, the next set of data (e.g., collaboration data packet) in the queue is sent to the requesting client. The control unit then returns to an idle state.

In state 1008, the control unit determines whether a virtual screen is currently available (e.g., packed and ready for transmission). If so, the method advances to state 1012.

Otherwise, in state 1010, the control unit sets a flag or otherwise notes that the virtual screen should be packed the next time a media sync modifier is received for all media streams. Or, a specific request may be issued to pack the virtual screen at the next opportunity. The method then proceeds to state 1006.

In state 1012, the control unit determines whether it should send the available (or most recent) virtual screen. Illustratively, if a packed virtual screen is smaller in size than the full panoply of data that would have to be sent to the client to bring it to the same state as the virtual screen, then the virtual screen should be sent. If an available virtual screen should be sent, the illustrated method continues at state 1014; otherwise, it proceeds to state 1010.

In state 1014, the virtual screen is sent to the client and the queue is collapsed accordingly. In particular, the client's pointer is updated to correspond to the most recent data included in the virtual screen. And, entries at the tail end of the queue may be discarded if all other clients have already received them. The control unit then returns to an idle state.

In state 1020, the control unit must determine whether it should apply a hard queue collapse. Therefore, the control unit examines whether the queue size has reached a hard limit. If not, the illustrated method advances to state 1030.

Otherwise, the maximum queue size has been reached, and in state 1022, the queue is collapsed. The client(s) at the end of the queue are placed in a list, or otherwise scheduled, to receive the virtual screen, and their queue pointers will be updated according to the most recent data in the virtual screen.

In optional state 1024, if a flag or other marker had been set to request a virtual screen at the next full media sync, the control unit may determine whether any clients are currently in the danger zone (described above). If not, the flag may be cleared to indicate that no clients presently need the virtual screen. The illustrated method then advances to state 1030.

In state 1030, the new data are queued. In state 1032, the virtual client retrieves or receives the new data (e.g., via a data consumer object).

In state 1034, the control unit (e.g., a virtual client) determines whether the new data includes a media sync modifier specifying that all media streams are to be reset. If it does, the method proceeds to state 1036; otherwise, the method enters an idle state.

In state 1036 the control unit determines whether a particular flag or marker is set to request the virtual screen be packed for transmission. If not, the method proceeds to an idle state.

Otherwise, in state 1038, the control unit (e.g., a virtual client) packs the virtual screen data and any other objects or information (e.g., caches) needed to recreate the current state of the virtual screen. The size of the packed virtual screen may be stored or noted.

In state 1040, the threshold described above may be updated. In particular, this threshold marks the location in the queue at which the combined size of all queued data between the head of the queue and the threshold equals or is greater than the size of the virtual screen. The control unit then returns to an idle state.

To help determine whether a control unit's data queue should be collapsed, in one embodiment of the invention, each entry in the queue is augmented with a measure of the number of bytes (e.g., of collaboration data) that have been processed by the control unit so far. The measure may or may not include the data in the present entry.

Thus, the first entry in a control unit's queue, after it is initialized, is marked with the value zero. The second entry is marked with the amount of data in the first entry. The third entry is marked with the amount of data indicated in the first entry plus the amount of data in the second entry, and so on. This prevents the control unit from having to add the amount of data in each entry when it needs to needs to determine whether it would be help efficiency to collapse the queue.

In one alternative method of queue collapsing, queued data are analyzed and redundant or obsolete data are removed. For example, in a whiteboard collaboration mode, if one entry in the queue represents a clearing of the whiteboard by the presenter, data between that entry and a slow client that has not yet reach that entry may be dropped.

A Real-Time Collaboration Client

In one embodiment of the invention, a client capable of participating in a real-time collaboration is modified for the collaboration without requiring the client to be rebooted. And, if the client is rebooted, the client will not lose the ability to participate in the collaboration.

In a client computing device, a display driver is executed to drive operation of a video display. In an embodiment of the invention, a table for facilitating function calls into the display driver is patched to call a different module. This module completes the call to the display driver, but also applies the call to update the state of the real-time collaboration. Thus, video operations that change the appearance of the video display are intercepted for use in the collaboration.

Figure 11:
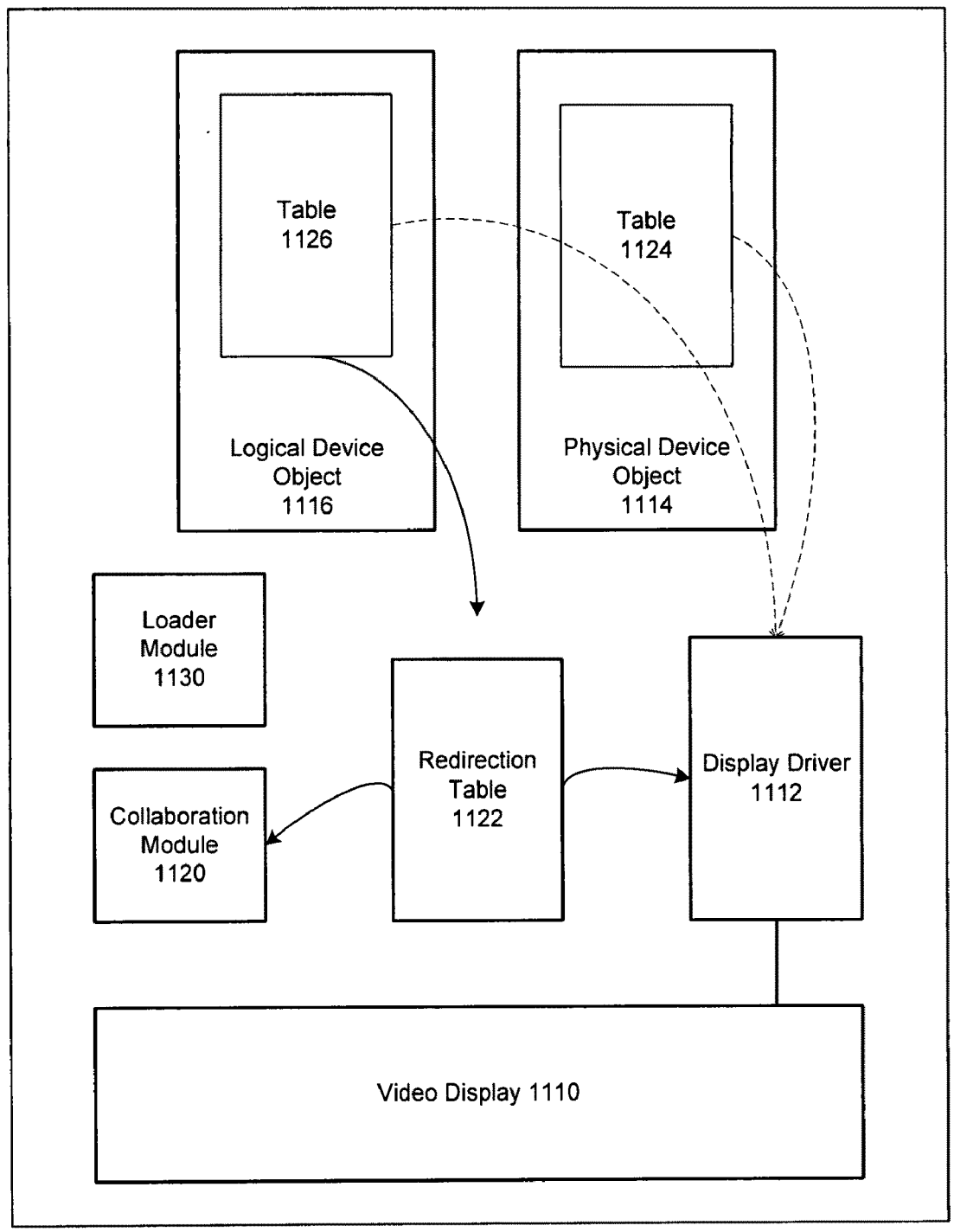
FIG. 11 is a block diagram of a client configured to participate in a real-time collaboration without having to first reboot, according to one embodiment of the invention.

FIG. 11 is a block diagram of a client configured according to one embodiment of the invention. Client 1102 includes video display 1110, which is driven by display driver 1112.

Physical device object 1114 and logical device object 1116 correspond to the video display. Each device object includes a table (i.e., tables 1124, 1126) designed to facilitate the lookup and invocation of display driver functions. Table 1124 may be considered the "primary" table, because it is used during operation of the client. Table 1126 may be considered a "secondary" or backup table, which may be activated in place of, or copied over, the primary table when needed (e.g., when the video mode changes). These tables may ordinarily store addresses, in display driver 1112, of video functions offered by the display driver.

Thus, before implementation of an embodiment of the invention, tables 1124, 1126 may be configured to lookup or make calls to functions provided by display driver 1112, as indicated by the dashed line.

When an embodiment of the invention is implemented, however, collaboration module 1120 is installed, which assembles redirection table 1122. And, table 1126 of logical device object 1116 is patched to point to or refer to redirection table 1122 instead of display driver 1112.

Collaboration module 1120 then alters the video mode of video display 1110, by changing the refresh rate, screen size or resolution, color depth, or some other parameter. In response to this alteration, table 1126 is copied over table 1124 and is thereafter used to facilitate video operations. As one skilled in the art will recognize, changing the video mode will cause the video display to be reset, which will reset the video state information maintained by the display driver.

When a call to display driver 1112 is received at redirection table 1122, the redirection table forwards the call to display driver 1112 so that the call is handled by the display driver and the video display is updated as necessary. However, the redirection table also passes the call or its effects to collaboration module 1120. Thus, after the video mode is changed and the video state reset, collaboration module 1120 is able to keep track of the state and appearance of the video display.

Collaboration module applies intercepted video function calls to update or supplement the client's real-time collaboration, as necessary. Thus, if the intercepted call was designed to draw an object on the video display, display driver 1112 will still do so. In addition, collaboration module 1120 can forward the operation to other collaborators (e.g., as part of a shared desktop or whiteboard mode of collaboration).

In an embodiment of the invention, when the video mode of video display 1110 is altered, and physical device object 1114 is reinitialized, collaboration module 1120 may create surface objects corresponding to any or all of the surface objects created by the physical device object for video operations. However, as only video operations performed on the primary surface object are written to the video display, collaboration module 1120 may only create a primary surface object.

Illustratively, display driver 1112, physical device object 1114, logical device object 1116, collaboration module 1120 and redirection table 1122 may all be installed in client system memory (e.g., the kernel). Further, redirection table 1122 may be installed as part of, or separate from, collaboration module 1120.

In one embodiment of the invention, a collaboration client is also modified to enable a method of intercepting video operations to be implemented after the client reboots. In this embodiment, loader module 1130 is installed on the client, and is configured to be loaded before the client's normal display driver. As one skilled in the art will appreciate, the Windows operating system, among others, provides this functionality.

When loader module 1130 is loaded during a system boot, it begins monitoring operating system calls to load system images. Eventually, it identifies and intercepts a call to load the display driver. It may detect a call to load the display driver by comparing the names of images the operating system attempts to load with the name of the display driver stored in a registry or other configuration file (e.g., the Windows registry). For example, in a Windows operating system environment, loader module 1130 monitors LoadSystemImage calls to the Windows executive module.

When a call to load the display driver is intercepted, the display driver is allowed to load, but the loader module replaces or modifies the return value so that the operating system will make video calls to redirection table 1122 instead of the display driver. Also, the loader module loads collaboration module 1120. The operating system then configures the physical and logical device objects in its normal manner, but based on the contents of redirection table 1122.

In one embodiment of the invention, loader module 1130 is a relatively simple programming module. Thus, it may just load collaboration module 1130, and the collaboration module may intercept the call to load the display driver, and perform any other processing necessary to enable interception of video calls.

Therefore, in this embodiment, the loader module rarely, if ever, will need to be updated or replaced. Any code that may be expected to need updating or replacement may reside in the collaboration module. If the collaboration module is updated, no change of video mode is required. This is because the collaboration module retains its accumulated state information in such a format that the information can be transferred to the substitute module (i.e., the state information need not be collected from the operating system).

Yet further, the collaboration module may comprise multiple sub-modules, so that code not expected to change may reside in one set of sub-modules, while code that may need to be updated or replaced may reside in another set of sub-modules.

Figure 12:
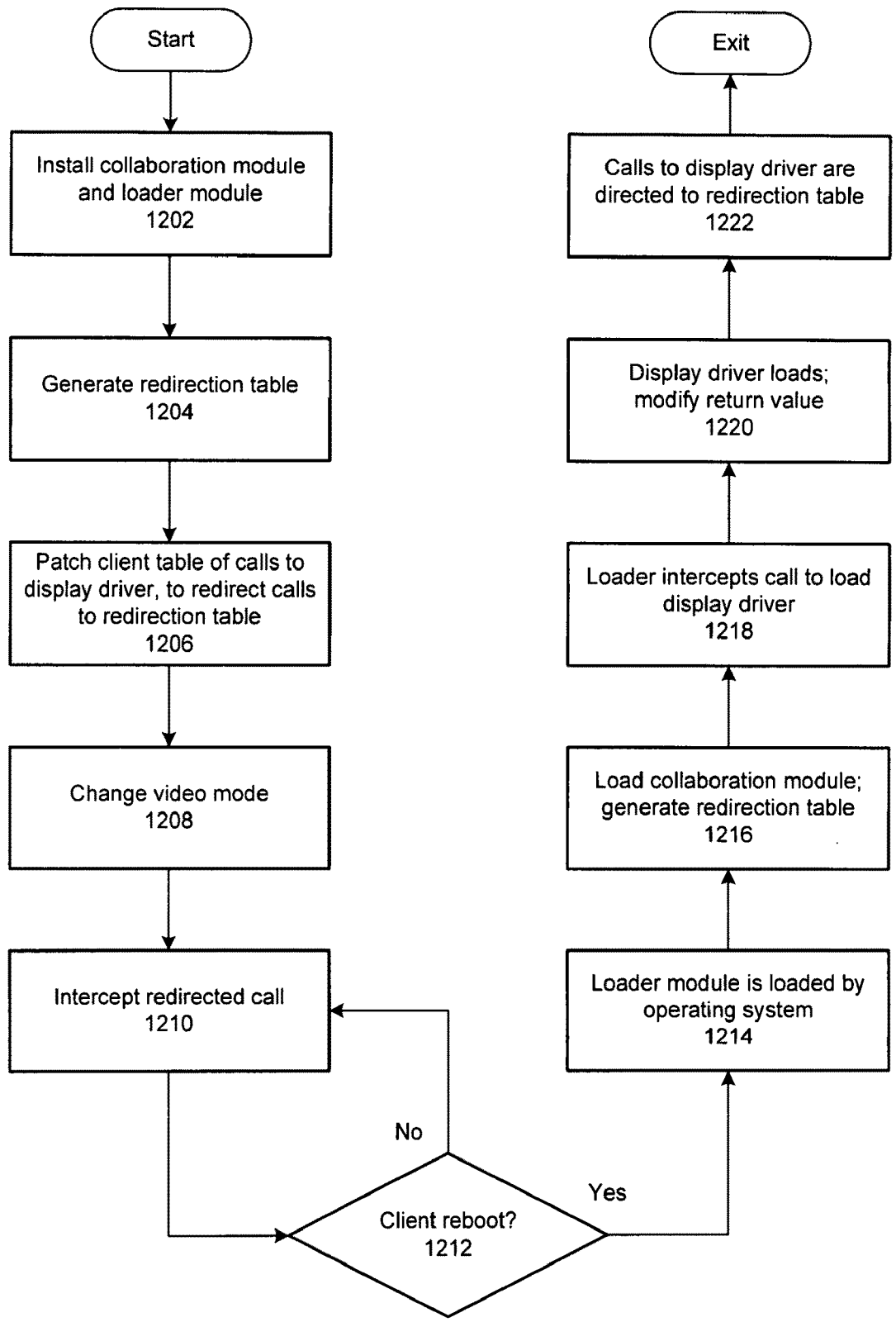
FIG. 12 is a flowchart demonstrating a method of configuring a client to participate in a real-time collaboration without first rebooting, according to one embodiment of the invention.

FIG. 12 demonstrates a method of configuring a client for participating in a real-time collaboration, according to one embodiment of the invention. In this embodiment, if the client is rebooted, the client is reconfigured to maintain compatibility with the collaboration.

In state 1202, a collaboration module and loader module are installed on the client. Illustratively, the collaboration module may be installed and executed when the client connects to a real-time collaboration server, or other system, in order to join a collaboration. The collaboration module may install the loader module. The loader module is configured to be loaded into system memory, before a video display driver, if and when the client is rebooted.

In state 1204, a redirection table is created to receive directed or redirected calls to the video display driver. The redirection table may be generated by the collaboration module. The redirection table is configured to forward an intercepted call to the display driver and to the collaboration module.

In state 1206, a client table configured to facilitate calls to the display driver is patched to direct or redirect such calls to the redirection table. Illustratively, this table is maintained by the client operating system as part of a physical or logical device object corresponding to the client video display.

In state 1208, the collaboration module initiates a change to the video mode of the video display. Illustratively, the collaboration module may first attempt to modify the display's refresh rate. If that is unsuccessful (e.g., the display is only configured to operate at one frequency), the collaboration module will attempt to change a different parameter (e.g., screen size or resolution, color depth). In different embodiments of the invention, virtually any dynamically modifiable video mode parameter may be altered.

In state 1210, the collaboration module receives and uses intercepted video calls for a real-time collaboration. For example, if the client desktop is being shared with other collaborators, the collaboration module may capture changes to the desktop and disseminate them to the collaborators, as described in a previous section. Thus, the collaboration module may comprise a desktop sharing module and/or a coder/decoder. Intercepted calls are also passed to the display driver so they may be completed normally.

In state 1212, if the client is rebooted, the method proceeds to state 1214. Otherwise, the collaboration module continues to intercept calls to the display driver.

In state 1214, when the client is rebooted, the loader module is loaded into system memory before the display driver is loaded.

In state 1216, the loader module loads the collaboration module and the redirection table is generated (e.g., by the collaboration module).

In state 1218, the loader module intercepts a call to load the display driver. As described above, to intercept the correct call, the loader module may compare identities of images the operating system attempts to load with an identity of the display driver stored in an operating system registry or configuration file.

In state 1220, the display driver is allowed to load, but a return value from the call is modified so that the operating system will configure a client table designed to facilitate calls to the display driver to call the redirection table instead of the display driver.

In state 1222, calls to the display driver are intercepted as they were before the client was rebooted. Thus, the collaboration module is able to update a real-time collaboration without noticeably affecting normal operation of the client video display. The method then ends.

In one embodiment of the invention, a real-time collaboration client is configured to participate in, or host, a desktop sharing collaboration mode. One form of a desktop sharing collaboration mode was described in a previous section. In this embodiment, the client is configured with a desktop sharing engine.

Figure 13:
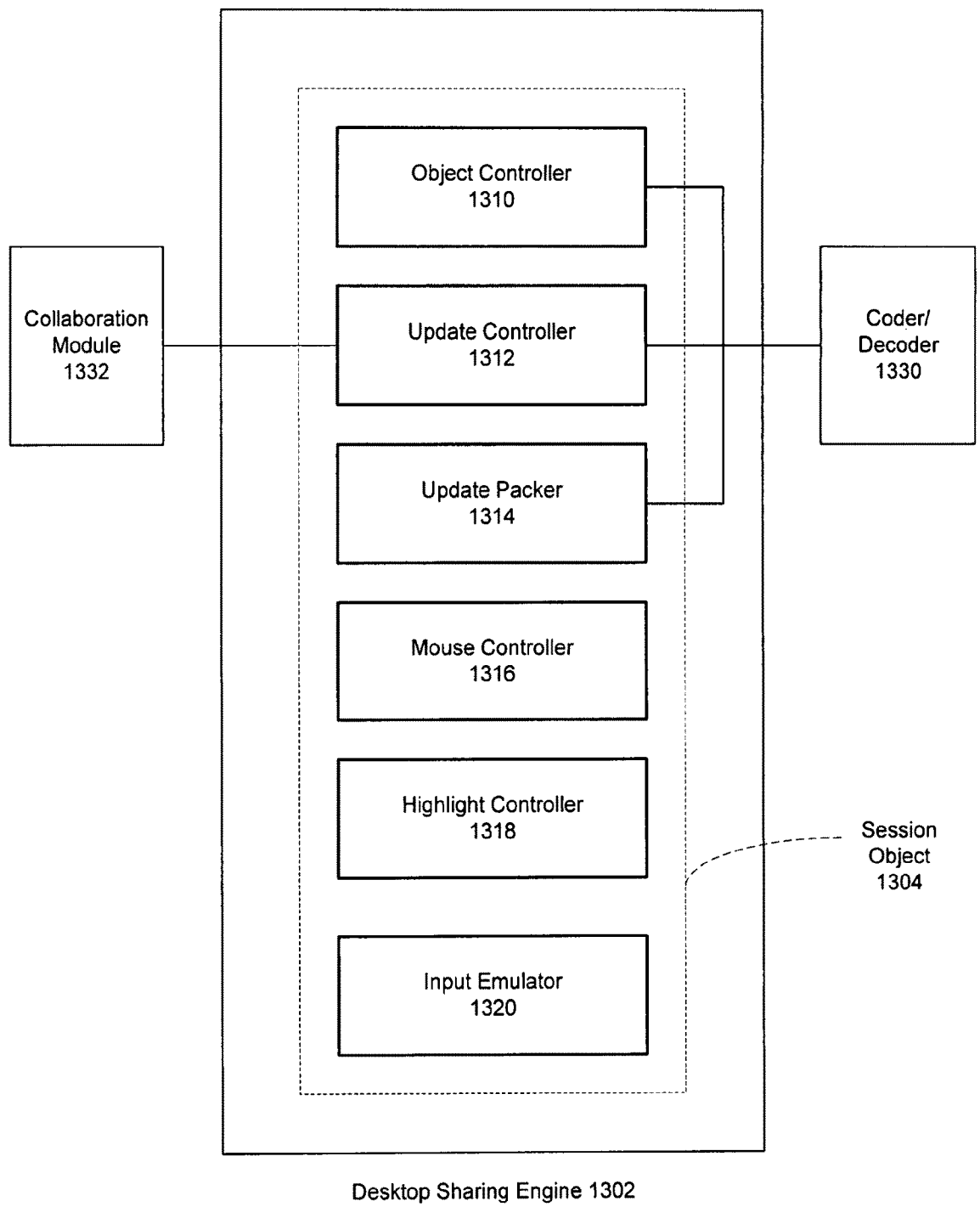
FIG. 13 is a block diagram of a desktop sharing engine according to one embodiment of the invention.

FIG. 13 is a block diagram of a desktop sharing engine according to this embodiment of the invention. In FIG. 13, desktop sharing engine 1302 includes several modules: object controller 1310, update controller 1312, update packer 1314, mouse controller 1316, highlight controller 1318 and input emulator 1320. Any or all of these modules may be combined or further divided.

Desktop sharing engine 1302 may implement multiple session objects, such as session object 1304. Each session object includes a separate set of the modules listed above, for a separate desktop sharing session. For example, different applications or portions of a desktop may be shared in different sessions.

Object controller 1310 manages desktop objects that are shared as part of the collaboration mode and that are visible to collaboration participants (e.g., windows, applications, desktop areas). In addition to these shared objects, there may also be disabled objects, which are not visible to other participants, even if located in a region or area of the desktop that is being shared. Thus, the following types of objects may be either shared or disabled: a window, an application, a rectangular area of the display screen, the entire screen. Object controller 1310 offers an interface that provides methods for: adding or removing an object to/from a list of shared objects, adding or removing an object to/from a list of disabled objects, and calculating a current shared region.

Because the object controller is responsible for managing lists of shared and disabled objects, it is able to identify or define a bound region for a desktop sharing collaboration. It can also indicate when the shape of the bound region has changed.

Update controller 1312 identifies a part of the client display screen in which content has changed, and can provide content (e.g., pixels) from the changed area. The update controller provides an interface to collaboration module 1332, which is described further below. Another embodiment of a collaboration module was described above in conjunction with FIG. 11. The interface provided by update controller 1312 includes any or all of the following methods: return the current shared region and corresponding screen update data, and return an event object that is signaled when a change occurs on the display screen.

Update packer 1314 obtains data from update controller 1312 and calculates regions of the display screen in which content changed. In one implementation, the client display screen is divided into clusters and the update packer calculates a checksum on the content in each region. Update packer 1314 identifies regions in which changes actually occurred by comparing consecutive checksums. When the shared desktop changes, updated content is copied to an off-screen buffer; every cluster whose checksum changed is added to the defined "changed region" comprising all changes.

When a change is noticed in the bound region, the update packer is asked (e.g., by session object 1304) for the new changed region (i.e., the region encompassing all changes) and a set of raw source blits. To satisfy this request, the update packer does the following:

1) asks the update controller for screen updates and sources blits since the last set of changes; the update controller provides raw update region data and raw source blits in response;
2) if the update packer retains an update region from a previous transaction, combines that region with the new update region after raw source blits are applied;
3) excludes the invalid region from the update region (the invalid region includes area(s) of the screen being repainted or awaiting repainting);
4) calculates the region actually changed (e.g., by comparing cluster checksums, as described above); and
5) reports the changed region and raw source blits.

Mouse controller 1316 tracks the position and shape of the mouse cursor. Illustratively, the mouse controller may use a polling algorithm that periodically calls the GetCursorPos function to track cursor position. It may also periodically call the GetCursor function to track changes in the cursor shape. A change in cursor shape may be detected by comparing responses to consecutive GetCursor calls. The interface provided by mouse controller 1316 includes methods for: checking if the cursor position has changed and returning the current position if it has changed, and checking if the cursor shape has changed and returning the current shape if it has.

Highlight controller 1318 provides visual feedback regarding a shared area of the desktop. In this embodiment of the invention, there are three types of visual feedback. First, a shared area of the display screen that is not bound to any window is visualized with a two-pixel wide color border. The border may be implemented as a non-rectangular topmost window. Second, shared windows are visualized with one-pixel wide color borders that may be implemented with a system-wide message hook that modifies processing of the WM_NCPAINT message.

Third, a special button is added to each window title. This button allows a user to share or stop sharing that window with a single mouse click. The button's appearance changes, depending on whether the window is currently being shared. This functionality may be implemented using a system-wide message hook that modifies processing of WM_NCPAINT and WM_NCACTIVATE messages.

An interface provided by highlight controller 1318 provides methods to: set the current highlighting mode (all three feedback methods can be turned on/off independently) and retrieve the current highlighting mode.

Input emulator 1320 emulates input events (e.g., cursor movements, content changes) received from remote entities (e.g., other clients participating in the desktop sharing collaboration). Remote input events may be restricted to the currently shared area of the desktop. For example, coordinates of remote mouse events may be compared to the shared region to determine whether the event should be implemented or discarded. Remote keyboard events are tied to particular windows. A given keyboard event is implemented only if its window lies entirely within the shared area of the desktop. Local input is usually given priority over remote input.

Illustratively, the desktop sharing engine or a session object may poll the various modules for changes, and call coder/decoder 1330 to encode information that has changed (e.g., the bound region, the changed region, source blits cursor position, cursor shape).

A real-time collaboration client may initiate a desktop sharing collaboration mode as follows. A session object is created and a shared area of the client desktop (e.g., one or more windows or applications) is associated with the session object. Various aspects of visual highlighting of the shared area may be enabled or disabled (e.g., highlighting of borders, window title buttons). The session object can then start receiving screen updates and input events. Remote user input events may also be received. The session object is destroyed when the collaboration mode ends.

In one embodiment of the invention, a real-time collaboration client includes a collaboration module to maintain, in system memory, an exact copy of some or all of the content of client display screen. Illustratively, each display command or drawing request it receives is replayed on the off-screen memory surface.

The collaboration module may operation in two phases. In an accumulation phase, display commands are processed and accumulated. In a normalization phase, accumulated data (e.g., updates caused by the accumulated commands) are converted to update primitives and returned to upper layers (e.g., desktop sharing engine, update controller) for further processing.

The collaboration module may commence operating in the accumulation phase, during which drawing commands from applications are applied to the display screen, and are intercepted by the collaboration module (e.g., via a redirection table such as redirection table 1122 of FIG. 11). The intercepted commands are applied to an off-screen surface and characteristics of the commands may be saved (e.g., as a source blit or part of the dirty region). When an upper layer requests the accumulated data, the algorithm switches to the normalization phase and provides the corresponding primitives to the upper layer in a suitable form. The collaboration module then returns to the accumulation phase.

More specifically, during the accumulation phase, the region of the display screen affected by a drawing command (e.g., the "affected region") is identified and merged with the current "dirty region." The dirty region is a region containing all points affected by drawing commands (other than raw source blits) received since the beginning of the current accumulation phase. In the following normalization phase, bitmap copy primitives for reproducing pixels in the dirty region are sent to upper layers for distribution to remote collaborators. The primitives may be generated during the accumulation and/or normalization phases. Raw source blits are treated differently—they are stored in an array of raw source blits. The dirty region (or primitives for reproducing the dirty region) and the array of raw source blits constitute input to the normalization phase.

However, before being stored in the array, raw source blits receive additional processing. First, "dirty region propagation" is performed. In dirty region propagation, the destination position of a raw source blit is subtracted from the current dirty region because that part of the display will be overwritten by the source blit. Then the intersection of the source position of the taw source blit with the current dirty region is found and propagated to the destination of the blit to determine where those "dirty" pixels will appear when the source blit is executed. The intersection can then be excluded from the source location of the blit.

Second, "source propagation" is performed to find the origin of any pixels involved in a sequence of multiple source blits. The source position of the current raw source blit is intersected with the destination position of the next oldest raw source blit in the array of blits. If the intersection is non-empty, it is separated from the original blit, propagated to the source of the preceding blit, and stored in the raw source blits array. The remainder is then intersected with the destination of the next oldest source blit in the array, and so on. This process continues until the source region of the original blit is empty or every raw source blit in the array is visited. In the latter event, the remainder is appended to the source blits array.

As one skilled in the art will appreciate, propagation of a set of pixels can be performed as follows. A region R of pixels may be represented as a set of points (x, y). A source blit may be represented as a tuple in the form <D, dx, dy>, wherein D is a destination region (i.e., a set of pixels) of the blit, dx is a horizontal offset from the source region and dy is a vertical offset. Thus, when a source blit is executed to change a display screen, every pixel (x, y) in a destination region D of a source blit is copied from a source region as follows: screen [x, y]:=screen x–dx, y–dy]. The source region need not be specifically identified because it can be easily calculated using the destination region and offsets.

To propagate a region R to the destination of a source blit allows one to determine where the region would appear if it were moved with the pixels of the source blit. The original region R may be offset to region R' as follows:

$$R'=\{(x+dx,y+dy)|(x,y)\in R\}$$

To propagate a region R to the source of a source blit allows one to determine where the source pixels lie:

$$R'=\{(x-dx,y-dy)|(x,y)\in R\}$$

Thus, in one embodiment of the invention, an accumulation phase may proceed as indicated in the following pseudo-code:

```
Dirty := ∅;
RawBlits := ∅;
for each primitive drawing command P, do:
    if P is not a raw source blit then
        R := region affected by P;
        Dirty := Dirty ∪ R;
    else
        S := source(P);
        D := destination(P);
                                {Dirty region propagation}
        X := Dirty ∩ S;
        Dirty := (Dirty \ D) ∪ X;
        S := S \ X;
                                {Source propagation}
        for i := top(RawBlits) to 0 do
            X := destination(RawBlits[i]) ∩ S;
            if X ≠ ∅ then
                offset X to the source of RawBlits[i];
                append X to end of RawBlits array;
            end if
            S := S \ X;
            if S = ∅ then end for;
        end;
        if S ≠ ∅ then append S to end of RawBlits array;
    end if;
end for;
```

In the normalization phase, an output stream of update primitives is generated to be sent to remote clients participating in the desktop sharing collaboration. Raw source blits are processed to enable unambiguous replay on remote clients. Then pixels belonging to the dirty region are captured and converted into bitmap copy primitives. Illustratively, the source blit primitives are streamed first, followed by the bitmap copy primitives.

As indicated above, the destination location of a source blit may be affected by a subsequent drawing command. In other words, the blit destination may intersect the dirty region or the destination of another source blit. This intersection can be omitted from the source blit primitive because it will be filled by bitmap copy primitives or a subsequent blit.

A collision detection scheme may be applied to detect collisions between source blits. When a source blit is fetched from the raw source blits array to be added to the output stream, source regions of remaining blits in the array are tested for intersection with the destination of the current blit. If an intersection is non-empty, it is subtracted from the corresponding bit and added to the dirty region.

Thus, a normalization phase may operate in a manner similar to the following pseudo-code:

```
Primitives := ∅;
for i := top(RawBlits) to 0, do:
    D := destination(RawBlits[i]);
    D := D \ Dirty;
    for j := i–1 to 0 do
        destination(RawBlits[j]) := destination(RawBlits[j]) \ D;
        X := source(RawBlits[j]) ∩ D;
        X := offset X to the destination of RawBlits[j];
        Dirty := Dirty ∪ X;
    end;
```

-continued

```
    if D ≠ Ø then append RawBlits[i] to end of Primitives;
end;
```

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of managing a queue of collaboration data for clients participating in a real-time collaboration, comprising:
   operating a control unit configured to manage dissemination of collaboration data to clients participating in a real-time collaboration;
   in said control unit, maintaining a queue to store said collaboration data, wherein the clients are configured to consume said collaboration data in the order queued;
   for each client:
      maintaining a reference identifying a queue entry comprising data currently being processed by the client; and
      executing a virtual client configured to maintain a virtual screen comprising a portion of the collaboration data;
   receiving from a first client a request for data from a next entry in the queue;
   identifying a virtual screen entry in the queue comprising the newest collaboration data included in the virtual screen;
   determining a total amount of data in all queue entries between the next entry and the virtual screen entry, inclusive;
   comparing the amount of data in the virtual screen to the total amount; and
   collapsing the queue by:
      transmitting said virtual screen to the first client; and
      updating the client's reference to identify the queue entry comprising the newest data included in said virtual screen.

2. The method of claim 1, wherein said collapsing the queue further comprises:
   deleting one or more entries of the queue.

3. The method of claim 1, further comprising:
   determining whether the queue has reached a maximum size;
   wherein, if the queue has reached the maximum size, said first client is a client whose reference refers to the oldest entry in the queue.

4. The method of claim 1, further comprising:
   receiving new collaboration data from a presenter client;
   passing said new collaboration data to said virtual client; and
   storing said new collaboration data in the queue only after said virtual client processes said new collaboration data.

5. The method of claim 1, further comprising:
   receiving new collaboration data from a presenter client; and
   storing said new collaboration data in the queue;
   wherein said virtual client receives access to said stored new collaboration data at substantially the same time as the clients.

6. A computer readable storage medium storing instructions that, when executed by a computer, cause the computer to perform a method of managing a queue of collaboration data for clients participating in a real-time collaboration, the method comprising:
   operating a control unit configured to manage dissemination of collaboration data to clients participating in a real-time collaboration;
   in said control unit, maintaining a queue to store said collaboration data, wherein the clients are configured to consume said collaboration data in the order queued;
   for each client;
      maintaining a reference identifying the queue entry comprising data currently being processed by the client; and
      executing a virtual client configured to maintain a virtual screen comprising a portion of the collaboration data;
   receiving from a first client a request for data from a next entry in the queue;
   identifying a virtual screen entry in the queue comprising the newest collaboration data included in the virtual screen;
   determining a total amount of data in all queue entries between the next entry and the virtual screen entry, inclusive;
   comparing the amount of data in the virtual screen to the total amount; and
   collapsing the queue by:
      transmitting said virtual screen to the first client; and
      updating the client's reference to identify the queue entry comprising the newest data included in said virtual screen.

7. A real-time collaboration system, comprising:
   a processor;
   memory;
   a control unit configured to manage a mode of a real-time collaboration in which content of a first attendee's client is shared with other attendees' clients;
   a queue in which said control unit stores said content for transmission to the other attendees' clients, wherein the other attendees' clients are configured to consume the content in the order queued;
   one or more communication modules configured to transmit the content to the other attendees' clients;
   for each attendee's client:
      a corresponding reference identifying a queue entry containing content the client is currently processing; and
      a virtual client configured to maintain a virtual screen configured to mirror the content;
   wherein the control unit further comprises:
      a mechanism configured to receive a request for content in a first entry of the queue for a slow attendee client;
      a mechanism configured to identify an amount of content in the virtual screen;
      a mechanism configured to determine a total amount of content in the first entry, a second entry comprising the newest content mirrored in the virtual screen, and all entries between the first entry and the second entry; and
      a collapsing mechanism, wherein if the amount of content in the virtual screen is less than the total amount of content, the collapsing mechanism is configured to collapse the queue by:
         sending the slow attendee client a copy of the virtual screen; and
         updating the slow attendee client's corresponding reference to identify the second entry.

8. The system of claim 7, wherein updated content of the first attendee's client is provided to said virtual client prior to being stored in said queue.

9. The system of claim 7, wherein updated content of the first attendee's client is stored in said queue, and made available to said virtual client and the other attendees' clients, at substantially the same time.

10. The system of claim 7, wherein said virtual client is configured to render, in said virtual screen, updated content received from the first attendee's client.

11. The system of claim 7, wherein said virtual client is further configured to generate a copy of said virtual screen for transmission to a new attendee's client, to facilitate synchronization of the new attendee's client with the real-time collaboration.

12. The system of claim 7, wherein said control unit comprises said virtual client.

13. The system of claim 7, further comprising:
one or more data consumers configured to schedule the transmission of queued content to an attendee client.

14. The system of claim 13, wherein said one or more data consumers comprises one data consumer for each attendee client.

15. The system of claim 13, wherein said one or more data consumers comprises a data consumer for said virtual client.

16. The system of claim 7, further comprising:
one or more data providers configured to provide content to said control unit from attendees' clients, including said first attendee's client.

17. The system of claim 7, wherein the collapsing mechanism is configured to collapse said queue if said queue reaches a maximum size.

18. The system of claim 7, wherein collapsing said queue comprises:
identifying a slow attendee client, wherein the corresponding reference of said slow attendee client identifies the oldest entry in said queue;
sending the slow attendee client a copy of said virtual screen;
updating said slow attendee client's corresponding reference to identify the queue entry comprising the newest content mirrored in said virtual screen; and
deleting said oldest entry in said queue.

* * * * *

UNITED STATES PATENT AND TRADEMARK OFFICE
CERTIFICATE OF CORRECTION

PATENT NO.        : 7,516,179 B2                                         Page 1 of 1
APPLICATION NO.   : 11/732882
DATED             : April 7, 2009
INVENTOR(S)       : Huck et al.

It is certified that error appears in the above-identified patent and that said Letters Patent is hereby corrected as shown below:

In column 18, line 55, delete "(Or" and insert -- (or --, therefor.

In column 28, line 8, after "screen" insert -- . --.

In column 35, line 32, delete "taw" and insert -- raw --, therefor.

In column 38, line 10, in claim 6, delete "client;" and insert -- client: --, therefor.

Signed and Sealed this

Twenty-fifth Day of May, 2010

David J. Kappos
*Director of the United States Patent and Trademark Office*